(12) United States Patent
Kawamura et al.

(10) Patent No.: US 8,248,716 B2
(45) Date of Patent: Aug. 21, 2012

(54) IMAGING OPTICAL SYSTEM, AND IMAGING APPARATUS INCORPORATING THE SAME

(75) Inventors: Kazuteru Kawamura, Hachioji (JP); Keitaro Yokoyama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 169 days.

(21) Appl. No.: 12/925,470

(22) Filed: Oct. 21, 2010

(65) Prior Publication Data
US 2011/0235191 A1 Sep. 29, 2011

(30) Foreign Application Priority Data
Mar. 29, 2010 (JP) .................. 2010-074783

(51) Int. Cl.
*G02B 9/06* (2006.01)
(52) U.S. Cl. ....................... 359/794
(58) Field of Classification Search .............. 359/794
See application file for complete search history.

(56) References Cited

U.S. PATENT DOCUMENTS
2006/0285223 A1* 12/2006 Watanabe et al. ............ 359/689

FOREIGN PATENT DOCUMENTS
| JP | 55-067715 | 5/1980 |
| JP | 59-216114 | 12/1984 |
| JP | 01-319009 | 12/1999 |
| JP | 2001-083411 | 3/2001 |
| JP | 2007-034103 | 2/2007 |

* cited by examiner

*Primary Examiner* — Joseph P Martinez
(74) *Attorney, Agent, or Firm* — Kenyon & Kenyon LLP

(57) ABSTRACT

An imaging optical system has, in order from the object side to the image side thereof, a front lens group, an aperture stop, and a rear lens group. A lens located closest to object side in said front lens group always remains fixed in position, with satisfaction of the following conditions (1) and (2):

$$1.15 \leq fb/IH\omega \leq 1.7 \tag{1}$$

$$-4.0 \leq fn/f \leq -1.3 \tag{2}$$

where f is a focal length of the whole imaging optical system, fn is a focal length of a first negative lens in said front lens group, fb is a back focus of the imaging optical system upon focusing on an object point at infinity, and $IH\omega$ is a distance from an optical axis of a position where a chief ray from a maximum incident half angle of view ($\omega$) upon focusing on an object point at infinity is imaged at the imaging plane.

27 Claims, 15 Drawing Sheets

Example 1

Example 2

Example3

Example5

Example6

Example 7

Example 1

Example 2

Example5

Example6

IMAGING OPTICAL SYSTEM, AND IMAGING APPARATUS INCORPORATING THE SAME

This application claims benefit of Japanese Application No. 2010-074783 filed in Japan on Mar. 29, 2010, the contents of which are incorporated by this reference.

BACKGROUND OF THE INVENTION

The present invention relates generally to an optical system used on imaging apparatus or the like, and more particularly to an imaging optical system used on digital cameras or the like, and an imaging apparatus incorporating the same.

Recently developed cameras using electronic imaging devices, like digital cameras, are being improved in terms of size reductions and performance. With this, improvements in the size and performance of an associated optical system are in mounting need. Lens interchangeable cameras are not exceptional too, because of an increasing demand on their ability to be carried around. A lens system having a wide-angle region represented in terms of the maximum incident half angle of view of 32 degrees or higher (with a focal length of shorter than 35 mm on a 135 format basis) provides an easy-to-use angle of view in view of figure and scenic shots. The following imaging optical systems having a relatively wide-angle region have been known so far in the art.

The lens system disclosed in JP(A) 1-319009 has an exit angle of off-axis rays as large as 20 degrees, although there is a wide angle of view available as represented by a half angle of view of 47 degrees. Here take an interchangeable lens for a telephoto lens as an example. There is an exit angle difference between both lenses generally because the telephoto lens has a small exit angle. For this reason, the use of an electronic imaging device makes a lowering in the quantity of rim rays likely because of ray shading at the respective pixels of the imaging device. Filters such as IR cut filters have their transmittance heavily dependent on the angle of incidence. There is also difficulty in using a common electronic imaging device for both an interchangeable lens type imaging system and a fixed lens type imaging system.

The lens system disclosed in JP(A) 55-67715 has a long back focus, with the whole lens length tending to grow long during image taking.

The lens system disclosed in JP(A) 2007-34103 has an exit angle of the order of 10 degrees, and is less likely to be affected by an electronic imaging device, IR cut filters, etc., but size reductions are hardly achievable because its whole length is long relative to imaging device size.

The lens system disclosed in JP(A) 2001-83411 has a half angle of view of 31.6 degrees or less.

JP(A) 59-216114 discloses a rear focus type lens system. However, the focus group comprises a considerable number of lenses, and there is the need of focusing a lens group that is heavy relative to the size of the lens system. Consequently, it is difficult to obtain stabilized precision upon focus stop.

SUMMARY OF THE INVENTION

According to one aspect of the invention, there is an imaging optical system provided, which is characterized by comprising, in order from an object side to an image side thereof,
a front lens group (LF) having a plurality of lenses including at least one negative lens,
an aperture stop (S), and
a rear lens group (LR) having positive refracting power, wherein:

said rear lens group (LR) comprises, in order from the object side, a lens subgroup (LR1) having positive refracting power and a focus lens group (LRF) that has positive refracting power and moves upon focusing, and a lens located on the closest to object side in said front les group (LF) always remains fixed in position, with satisfaction of the following conditions (1) and (2):

$$1.15 \leq fb/IH\omega \leq 1.7 \tag{1}$$

$$-4.0 \leq fn/f \leq -1.3 \tag{2}$$

where f is the focal length of the whole imaging optical system, $fn$ is a focal length of a first negative lens (Ln1) on the closest to object side of negative lenses in said front lens group (LF) provided that lenses located on the closest to object side are not necessarily of negative power, $fb$ is the back focus of the imaging optical system upon focusing on an object point at infinity provided that the back focus is a length, as calculated on an air basis, from an image-side refractive surface of a lens located on the closest to image side in said rear lens group to an imaging plane, and $IH\omega$ is the distance from an optical axis of a position where a chief ray from a maximum incident half angle of view ($\omega$) upon focusing on an object point at infinity is imaged at the imaging plane.

The requirements for, and the advantages of such arrangement are now explained.

This arrangement with the aperture stop (S) interposed in it works in favor of making the whole length short and optimizing the exit angle while making sure the angle of view. As the whole length remains constant in whatever state imaging takes place, it is very effective for stabilized holding of the optical system and stabilized holding of an attachment optical system, and works in favor of reducing entrance of dirt as well.

To put it another way, if the negative lens having a given focal length is located on the object side with respect to the aperture stop (S), it is then possible to make sure the angle of view while keeping the diameter of the optical system small. In addition, if the angle that a rim beam traveling toward the image plane makes with the optical axis is gradually decreased by the lens subgroup (LR1) of positive refracting power and the focusing lens group (LRF) of positive refracting power, each located on the image side with respect to the aperture stop (S), it is then possible to facilitate minimizing a lowering of the quantity of rim light due to the imaging device. It is also easy to achieve the angle of exit at which the arrangement is less likely to be affected by the angle characteristics of filters.

For such arrangement, it is important to satisfy Condition (1) for the purpose of achieving size reductions.

By setting the lower limit to Condition (1) at no less than 1.15, the lens surface located on the closest to image side is prevented from drawing too close to the imaging plane and increasing in diameter, working in favor of making the optical system small.

By setting the upper limit to Condition (1) at no greater than 1.7, the back focus is limited so that the whole optical system lens is kept short, and even at an obtuse exit angle, there can be space ensured for receiving the rear lens group (LR) of positive refracting power. This in turn enables satisfactory performance to be achieved in view of aberration correction.

Condition (2) is a requirement for making it easy to reduce a lenses count while taking hold of a wide angle of view and performance even when the whole length of the optical system is shortened.

As the lower limit to Condition (2) is set at no less than −4.0 to allow the negative lens to have sufficient negative refracting power, it works in favor of taking hold of a wide angle of view, and prevents the lens group (LF) in front of the stop (S) from increasing in diameter, working in favor of reducing the whole size of the optical system in its diametrical direction. It also prevents the Petzval image plane from growing strong in the plus direction, working in favor of reducing astigmatic difference.

As the upper limit to Condition (2) is set at no greater than −1.3 to limit the refracting power of the negative lens, it facilitates making the back focus short, working in favor of making the whole length of the optical system short, or it helps reduce the lenses count of the positive rear group (LR) to keep the exit angle of off-axis rays small, leading to a decrease in the lenses count of the focus lens group (LRF). This in turn works in favor of quiet focusing operation and making sure focusing precision. Otherwise, it undercuts the tendency of the Petzval image plane to grow strong in the minus direction, working in favor of reducing astigmatic difference.

It is not always necessary that the first negative lens (Ln1) be the lens located on the closest to object side; that is, a positive lens may be located more on the object side than the negative lens (Ln1). This works in favor of correction of distortion.

On the other hand, the arrangement wherein the first negative lens (Ln1) is located on the closest to object side works in favor of size reductions and taking hold of the angle of view, and low costs as well.

Preferably in the invention as described above, any one of the following requirements should be satisfied.

Preferably, the first negative lens (Ln1) should be a meniscus lens concave on the aperture stop (S) side.

This works in favor of correction of astigmatism and coma when the arrangement has a wide angle design.

Preferably, the focus lens group (LRF) should comprise two lenses at most.

This enables the weight of the focus lens group to be so reduced that quiet focusing operation is achievable with improvements in focusing precision.

Preferably, the first negative lens (Ln1) should be located on the closest to object side in the imaging optical system.

This is because the retrofocus type effect is so boosted up that the diameter of the lens group on the object side with respect to the aperture stop (S) can be made smaller.

Preferably, the first negative lens (Ln1) should be a meniscus lens that is located on the closest to object side in the imaging optical system, and concave on the aperture stop (S) side.

As the negative meniscus lens concave with respect to the aperture stop (S) is located on the closest to object side, it works primarily in favor of correction of astigmatism and coma and, hence, a wide-angle arrangement.

For the invention, it is preferable to satisfy the following condition (3).

$$-3.5 \leq fn/flr \leq -0.8 \quad (3)$$

where flr is the focal length of the rear lens group (LR) of positive refractive power.

Condition (3) is a preferable requirement for offering a sensible tradeoff between taking hold of the back focus and optical performance, size reductions and short whole optical system length, thereby enabling the front lens group (LF) and the focus lens group (LRF) to be more simplified in construction.

As the lower limit to Condition (3) is set at no less than −3.5, it facilitates making sure the back focus even with a wide-angle arrangement, and undercuts the tendency of the Petzval image plane to grow strong in the minus direction, working in favor of correction of field curvature. It also facilitates taking hold of the back focus without increasing the refracting power of the negative lens (Ln1) in the front lens group (LF). This in turn reduces the lenses count of the front lens group (LF), working in favor of making the whole optical length short and reducing the size of the front lens group (LF).

As the upper limit to Condition (3) is set at no greater than −0.8, it undercuts the tendency of the Petzval image plane to grow strong in the plus direction, working in favor of correction of field curvature. It also prevents the back focus from growing larger than required so that performance can be easily kept while making the exit angle of rim rays small, even when the rear lens group (LR) of positive refracting power or the focus lens group (LRF) of positive refracting power is constructed of fewer lenses.

For the invention, it is preferable to satisfy the following condition (4).

$$1.5 \leq \Sigma d/IH\omega \leq 6.0 \quad (4)$$

where $\Sigma d$ is the length on the optical axis of the imaging optical system from the entrance surface to the exit surface.

Condition (4) is a preferable requirement for reducing the total thickness of the optical system while taking hold of optical performance.

As the lower limit to Condition (4) is set at no less than 1.5, it makes sure the imaging optical system has a given length on the optical axis, working in favor of achieving a function of staying an exit pupil away from the image plane while taking hold of optical performance.

On the other hand, size reductions should preferably be achieved by setting the upper limit to Condition (4) at no greater than 6.0.

For the invention, it is preferable to satisfy the following condition (5).

$$-2.7 \leq f11/(f \cdot \tan \omega) \leq -0.6 \quad (5)$$

where f11 is the entire focal length of two lenses: one located on the closest to object side in the imaging optical system and one located just after an image side thereof, and $\omega$ is the maximum incident half angle of view upon focusing on an object point at infinity.

Condition (5) is a preferable requirement for offering a sensible tradeoff between size reductions and a wide-angle arrangement with more stabilized optical performance.

As the lower limit to Condition (5) is set at no less than −2.7, it works in favor of reducing the diameter of the front lens group (LF) and taking hold of the back focus. It also undercuts the tendency of the Petzval image plane to grow strong in the plus direction, facilitating keeping astigmatic difference in check.

As the upper limit to Condition (5) is set at no greater than −0.6, it facilitates taking hold of rim performance. It also undercuts the tendency of the Petzval image plane to grow strong in the minus direction, facilitating reducing astigmatic difference.

Preferably, at least one of the two lenses: one located on the closest to object side in the imaging optical system and one located just after the image side should have an aspheric surface in which a local surface has a refracting power whose absolute value becomes small with a distance from the optical axis toward the periphery.

This works in favor of reducing astigmatism and distortion.

For the invention, it is preferable to satisfy Condition (6).

$$-2 \leq f11/flr \leq -0.3 \quad (6)$$

where f11 is the entire focal length of the two lenses: one located on the object side in the imaging optical system and one located just after the image side thereof, and flr is the focal length of the rear lens group (LR) of positive refracting power.

Condition (6) is a preferable requirement for simplifying the constructions of the front lens group (LF) and the focus lens group (LRF) while offering a sensible tradeoff between a wide-angle arrangement, the back focus, size reductions, and a short whole optical system length.

As the lower limit to Condition (6) is set at no less than −2, it facilitates achieving a wide-angle arrangement and taking hold of the back focus without making the negative refractive power of the front lens group (LF) strong. This in turn works in favor of reducing the lenses count of the front lens group (LF), shortening the whole optical length and reducing the lens diameter of the front lens group (LF). It also undercuts the tendency of the Petzval image plane to grow strong in the plus direction, working in favor of correction of astigmatic difference.

As the upper limit to Condition (6) is set at no greater than −0.3, it prevents the back focus from growing excessive so that the exit pupil can be easily stayed away from the image plane without increasing the lenses count of the rear lens group (LR) of positive refracting power or the focus lens group (LRF) of positive refracting power. Otherwise, it undercuts the tendency of the Petzval image plane to grow strong in the minus direction, working in favor of correction of astigmatic difference.

Preferably, it should be only the focus lens group (LRF) that moves in the optical axis direction.

As only the focus lens group runs as a moving group, it enables the lens barrel to be more simplified in construction, working in favor of size reductions and low costs. Although zooming requires a plurality of moving groups, a single-focus optical system works more in favor of offering a reasonable tradeoff between making sure optical performance and achieving size reductions.

Preferably, the focus lens group (LRF) should be located on the closest to image side in the imaging optical system.

As the focus lens group is located on the closest to image side, it facilitates taking hold of stable optical performance over a wide focus range because of the absence of a lens that relays influences of aberration fluctuations due to the movement of the focus lens group (LRF). Further, it allows the rear lens group (LR) to share positive refracting power with the lens subgroup (LR1) of positive refracting power and the focus lens group (LRF) of positive refracting power. This leads to taking hold of stable optical performance too, working in favor of size reductions.

Preferably in that case, the surface located the closest to object side in the focus lens group (LRF) should be a convex one that is convex on the object side.

This makes it easier to make sure the back focus, working more in favor of performance improvements.

For the invention, the focus lens group (LRF) should preferably be composed of one positive lens.

In the inventive imaging optical system, the focus lens group (LRF) may be composed of one positive lens, whereby the focus lens group is much lighter so that quiet focusing operation can easily be achieved with higher focusing accuracy.

For the imaging optical system, it is preferable to satisfy the following condition (7).

$$-25\% < DT < -7\% \quad (7)$$

DT here is the quantity of distortion:

$$DT = [(IH\omega - f\tan \omega)/(f\tan \omega)] \times 100(\%)$$

where ω is the maximum half angle of view upon focusing on an object point at infinity.

In principle, the construction of the retro-focus type generally used on wide-angle lenses is likely to produce negative distortion. If this negative distortion is allowed for, however, it works in favor of reducing the length and diameter of the imaging optical system from the entrance surface to the exit surface.

If a lens having strong negative refracting power is located on the objet side in the imaging optical system, negative distortion then grows large thereby keeping incident rays low and achieving size reductions. When a lens having strong positive refracting power is located on the image side in the imaging optical system, too, negative distortion grows large, resulting in a shortening of the back focus, and the distance of the imaging optical system from the entrance surface to the exit surface. This in turn works in favor of making the whole length short.

In other words, the more the quantity of distortion allowed for, the more it works in favor of size reductions of the wide-angle lens. An imaging optical system using an electronic imaging device may be electrically corrected for distortion. If much advantage is taken of this electrical processing, it is then possible to achieve size and diameter reductions.

As the lower limit to Condition (7) is set at no less than −25%, it prevents degradation in performance caused by excessive enlargement of an image by electrical correction of distortion.

As the upper limit to Condition (8) is set at no greater than −7%, it lets distortion be produced, making some contribution to size reductions, etc.

According to the second aspect of the invention, there is an imaging optical system provided, which comprises, in order from an object side to an image side thereof, a front lens group (LF) comprising a plurality of lenses including a first negative lens (Ln1) concave on the image side, an aperture stop (S), and a rear lens group (LR) having positive refracting power, wherein:

said rear lens group (LR) comprises, in order from the object side, a lens subgroup (LR1) having positive refracting power and a focus lens group (LRF) that has positive refracting power and moves upon focusing;

a lens group that moves in an optical axis direction is only said focus lens group; and said first negative lens (Ln1) is a lens of negative lenses in said front lens group, which lens is located on the closest to object side, preferably with satisfaction of the following conditions (4) and (7):

$$1.5 \leq \Sigma d/IH\omega \leq 6.0 \quad (4)$$

$$-25\% < DT < -7\% \quad (7)$$

where Σd is the length on the optical axis of the imaging optical system from the entrance surface to the exit surface thereof, IHω is the distance from an optical axis of a position where a chief ray from a maximum incident half angle of view (ω) upon focusing on an object point at infinity is imaged at the imaging plane, and DT is the quantity of distortion:

$$DT=[(IH\omega - f\tan\omega)/(f\tan\omega)]\times 100(\%)$$

where ω is the maximum incident half angle of view upon focusing on an object point at infinity.

With such basic arrangement as described above, it is possible to shorten the whole length of the imaging optical system while making sure an angle of view in a wide-angle region, and it is easy to stay the exit pupil away from the image plane so that the whole length of the imaging optical system can be kept constant all over the imaging range.

To put it another way, if the negative lens (Ln1) having a given shape is located on the object side with respect to the aperture stop (S), it is then possible to make sure satisfactory off-axis aberrations while keeping lens size small in the diametrical direction, thereby achieving a wide-angle arrangement. In addition, if the angle that rim rays traveling toward the image plane make with the optical axis is gradually decreased by the lens group (LR1) of positive refracting power and the focus lens group (LRF) of positive refracting power, each located on the image side with respect to the aperture stop (S), it is then possible to obtain the exit angle where the lowering of the quantity of rim light is minimized, and which is less likely to be affected by the angle characteristics of filters, etc. If the moving group is composed only of the aforesaid focus lens group (LRF), the construction and weight of the lens barrel used can then be simplified and reduced, working in favor of quieter and faster focusing operation with improved precision.

And configuring the image-side surface of the negative lens (Ln1) into a concave shape on the aperture stop side contributes mainly to reductions of astigmatism, coma, etc., working in favor of improvements in rim performance.

Condition (4) is a preferable requirement for reducing the total thickness of the optical system while making sure optical performance.

As the lower limit to Condition (4) is set at no less than 1.5, it makes sure the length on the optical axis of the imaging optical system, working in favor of making sure a function of staying the exit pupil away from the image plane while taking hold of optical performance.

On the other hand, it is preferable to set the upper limit to Condition (4) at no greater than 6 for the purpose of achieving size reductions.

As the lower limit to Condition (7) is set at no less than −25%, it prevents an image from being way too enlarged in association with electrical correction of distortion.

As the upper limit to Condition (7) is set at no greater than −7%, it permits distortion to be produced so that effects on size reductions, etc. are easily achievable.

Preferably, the first negative lens (Ln1) concave on the image side should be a meniscus lens.

This works in favor of achieving a wider-angle arrangement and keeping mainly astigmatism and coma in better states.

According to the third aspect of the invention, there is an imaging optical system provided, which comprises, in order from an object side to an image side thereof, a front lens group (LF) comprising a plurality of lenses including a first negative lens (Ln1) concave on the image side, an aperture stop (S), and a rear lens group (LR) having positive refracting power, wherein:

said rear lens group (LR) comprises, in order from the object side, a lens subgroup (LR1) having positive refracting power and a focus lens group (LRF) that has positive refracting power and moves upon focusing;

a lens group that moves in an optical axis direction is only said focus lens group (LRF); and said first negative lens (Ln1) is a lens of negative lenses in said front lens group, which lens is located on the closest to object side, preferably with satisfaction of the following conditions (3) and (6):

$$-3.5 \leq fn/flr \leq -0.8 \quad (3)$$

$$-2 \leq fl1/flr \leq -3 \quad (6)$$

where fn is the focal length of a negative lens (LF1) of negative lenses in said front lens group (LF), which negative lens is located on the closest to object side, flr is the focal length of said rear lens group (LR) of positive refractive power, and f11 is the combined focal length of two lenses: one located on the closest to object side in the imaging optical system and one located just after the image side thereof.

With such basic arrangement as described above, it is possible to shorten the whole length of the imaging optical system while making sure an angle of view in a wide-angle range, and it is easy to stay the exit pupil away from the image plane so that the whole length of the imaging optical system can be kept constant all over the imaging range.

To put it another way, if the negative lens (Ln1) having a given shape is located on the object side with respect to the aperture stop (S), it is then possible to make sure satisfactory off-axis aberrations while keeping lens size small in the diametrical direction, thereby achieving a wide-angle arrangement. In addition, if the angle that rim rays traveling toward the image plane make with the optical axis is gradually decreased by the lens group (LR1) of positive refracting power and the focus lens group (LRF) of positive refracting power, each located on the image side with respect to the aperture stop (S), it is then possible to obtain the exit angle where the lowering of the quantity of rim light is minimized, and which is less likely to be affected by the angle characteristics of filters, etc. If the moving group is composed only of the aforesaid focus lens group (LRF), the construction and weight of the lens barrel used can then be simplified and reduced, working in favor of quieter and faster focusing operation with improved precision.

And configuring the image-side surface of the negative lens (Ln1) into a concave shape on the aperture stop side contributes mainly to reductions of astigmatism, coma, etc., working in favor of improvements in rim performance.

Condition (3) is a preferable requirement for offering a sensible tradeoff between taking hold of the back focus and optical performance, size reductions and short whole optical system length, thereby enabling the front lens group (LF) and the focus lens group (LRF) to be more simplified in construction.

As the lower limit to Condition (3) is set at no less than −3.5, it helps make sure the back focus even with a wide-angle arrangement, and undercuts the tendency of the Petzval image plane to grow strong in the minus direction, working in favor of correction of field curvature. It also facilitates taking hold of the back focus without increasing the refracting power of the negative lens (Ln1) in the front lens group (LF). This in turn reduces the lenses count of the front lens group (LF), working in favor of making the whole optical length short and reducing the size of the front lens group (LF).

As the upper limit to Condition (3) is set at no greater than −0.8, it undercuts the tendency of the Petzval image plane to grow strong in the plus direction, working in favor of correction of field curvature. It also prevents the back focus from growing larger than required so that performance can be easily kept while making the exit angle of rim rays small, even when the rear lens group (LR) of positive refracting power or the focus lens group (LRF) of positive refracting power is constructed of fewer lenses.

Condition (6) is a preferable requirement for simplifying the constructions of the front lens group (LF) and the focus lens group (LRF) while offering a sensible tradeoff between a wide-angle arrangement, the back focus and size reductions, and a short whole optical system length.

As the lower limit to Condition (6) is set at no less than −2, it facilitates making sure a wide-angle arrangement and the back focus without making the negative refractive power of the front lens group (LF) strong. This in turn works in favor of reducing the lenses count of the front lens group (LF), shortening the whole optical length and reducing the lens diameter of the front lens group (LF). It also undercuts the tendency of the Petzval image plane to grow strong in the plus direction, working in favor of correction of astigmatic difference.

As the upper limit to Condition (6) is set at no greater than −0.3, it prevents the back focus from growing excessive so that the exit pupil can be easily stayed away from the image plane without increasing the lenses count of the rear lens group (LR) of positive refracting power or the focus lens group (LRF) of positive refracting power. Otherwise, it undercuts the tendency of the Petzval image plane to grow strong in the minus direction, working in favor of correction of astigmatic difference.

For the invention it is preferable to satisfy the following condition (8).

$$1.5 \leq fl\_fo/flr \leq 8.0 \quad (8)$$

where $fl\_fo$ is the focal length of the focus lens group (LRF) of positive refracting power, and flr is the focal length of the rear lens group (LR) of positive refracting power.

Condition (8) is a preferable requirement for achieving size reductions while reducing fluctuations of optical performance upon focusing, and for effectively keeping the exit angle of off-axis rays small as well.

As the lower limit to Condition (8) is set at no less than 1.5, it enables the refracting power of the focus lens group to be so properly reduced that fluctuations of aberrations upon focusing can be easily held back, working in favor of making sure performance during focusing on a close-range object.

As the upper limit to Condition (8) is set at no greater than 8.0, it enables the amount of movement of the focus lens group to be so reduced that the length of the imaging optical system from the incident surface to the exit surface can be shortened, working in favor of size reductions. The function of keeping the exit angle small can be well shared with the positive lens group (LR1), working in favor of making sure optical performance.

For the invention, it is preferable to satisfy the following condition (9).

$$1.4 \leq SF11 \leq 4.0 \quad (9)$$

where SF11 is the shape factor of the first negative lens (Ln1) in the front lens group (LF):

$$SF11=(R11+R12)/(R11-R12)$$

where R11 is the paraxial radius of curvature of the object-side surface of the negative lens (Ln1), and R12 is the paraxial radius of curvature of the image-side surface of the negative lens (Ln1).

Condition (9) is a preferably requirement for keeping coma and astigmatic difference in good states while making sure a wide angle of view.

As the lower limit to Condition (9) is set at no less than 1.4, it holds back coma and the tendency of the Petzval image plane to grow strong in the plus direction while reducing the negative refracting power of the negative lens (Ln1), working in favor of obtaining a wide angle of view while keeping astigmatic difference in good states.

As the upper limit to Condition (9) is set at no greater than 4.0, it facilitates prevention of the diameter of the lenses before the aperture stop from growing large while making it easy to ensure that the first lens (Ln1) has negative refracting power.

For the invention it is preferable that the second negative lens (Ln2) is positioned just after the image side of the first negative lens (Ln1) in the front lens group (LF), with satisfaction of the following condition (10).

$$1.0 \leq SF21 \leq 7.0 \quad (10)$$

where SF21 is the shape factor of the second negative lens (Ln2):

$$SF21=(R21+R22)/(R21-R22)$$

where R21 is the paraxial radius of curvature of the object-side surface of the second negative lens (Ln2), and R22 is the paraxial radius of curvature of the image-side surface of the second negative lens (Ln2).

Condition (10) is a preferable requirement for keeping the function of the second negative lens (Ln2) located just adjacent to the image side of the first negative lens (Ln1) to correct aberrations in good states; for instance, it works in favor of making sure a wide angle of view in terms of a maximum incident half angle of view ($\omega$) of 35° or greater.

As the lower limit to Condition (10) is set at no less than 1.0, it holds back the refracting power of the second negative lens (Ln2), works in favor of reducing coma and undercutting the tendency of the Petzval image plane to grow strong in the plus direction, and works in favor of keeping astigmatic difference in good states over a wide angle of view.

As the upper limit to Condition (10) is set at no greater than 7.0, it works in favor of preventing the diameter of the lens in front of the aperture stop from growing large while making sure the second negative lens has negative refracting power.

For the invention, it is preferable to satisfy the following condition (11).

$$-1.4 \leq R\_LR1R/(f \tan \omega) \leq -0.5 \quad (11)$$

where R1LR1R is the paraxial radius of curvature of the lens surface on the closest to image side in the lens subgroup (LR1) in the rear lens group, f is the focal length of the whole imaging optical system, and $\omega$ is the maximum incident half angle of view upon focusing on an object point at infinity.

To maintain the optical performance of the focus lens group (LRF) upon focusing movement, it is desired that nearly all of primary aberrations like spherical aberration and coma are corrected at the surface on the closest to object side up to the lens surface located just before the focus group (LRF) in the imaging optical system.

As the lower limit to Condition (11) is set at no less than −1.4, it facilitates holding back undercorrection of such various aberrations as described above. This in turn eases off loads of correcting those aberrations at the focus lens group, and holds back fluctuations of optical performance upon focusing, working in favor of making sure performance in a close-range region.

As the upper limit to Condition (11) is set at no greater than −0.5, it enables the curvature of the exit surface in the lens subgroup to be properly held back, facilitating holding back over-correction of spherical aberrations and coma.

For the invention, it is preferred that the total lenses count of the focus lens group is two at most, with satisfaction of the following condition (12).

$$-4.5 \leq SF\_LRF \leq 0 \qquad (12)$$

where SF_LRF is represented by $$SF\_LRF=(R\_LRFF+R\_LRFR)/(R\_LRFF-R\_LRFR)$$

where R_LRFF is the paraxial radius of curvature of the lens surface located on the closest to object side in the focus lens group (LRF), and R_LRFR is the paraxial radius of curvature of the lens surface located on the closest to image side in the focus lens group (LRF).

Condition (12) is an advantageous requirement for holding back fluctuations of aberrations upon focusing to offer a sensible tradeoff between size reductions and making sure performance in a close-range region, even when the focus lens group is made up to two lenses at most.

As the lower limit to Condition (12) is set at no less than −1.4, it enables the focus lens group s sensitivity to focusing to be properly ensured, holds back an increase of the moving distance for making sure the close-range distance, and makes it easy to shorten the length of the imaging optical system from the entrance surface to the exit surface.

As the upper limit to Condition (12) is set at no greater than 0, it facilitates prevention of focus sensitivity from growing excessive, working in favor of making sure the back focus and reducing aberrations within the focus lens group, and working in favor of making sure performance in a close-range region as well.

For the invention, it is preferable to satisfy the following condition (13).

$$T\mathrm{air}\_max/\Sigma d \leq 0.27 \qquad (13)$$

where Tair_max is the longest axial air spacing length between the entrance surface and the exit surface in the imaging optical system, and $\Sigma d$ is the length on the optical axis of the imaging optical system from the entrance surface to the exit surface thereof.

Condition (13) is an advantageous requirement for making sure optical performance and shortening the whole length of the imaging optical system as well as for reducing the outer diameter of the imaging optical system.

Properly wide air spacing between lenses may possibly lead to improvements in performance, but all too a long axial distance ($\Sigma d$) from the lens surface located on the closest to object side and to the lens surface located on the closest to image side in the imaging optical system by which performance is ensured may often end up with an increase in the whole length of, and an increase in the diameter of lenses in, the imaging optical system. Satisfaction of Condition (13) works in favor of making sure the lenses count necessary for taking hold of performance while those whole length and diameter are reduced.

For the invention, it is preferable to satisfy the following condition (14).

$$3.0 \leq \Sigma d/IH\omega 30 \leq 10.0 \qquad (14)$$

where $\Sigma d$ is the length on the optical axis of the imaging optical system from the entrance surface to the exit surface thereof, and IHω30 is the height of the imaging optical system, as measured from the optical axis, at a point of intersection with the imaging plane of a chief ray incident at an angle of view of 30 degrees on the imaging optical system upon focusing on an object point at infinity.

Condition (14) is a preferable requirement for making the total thickness of the optical system small while making sure optical performance.

As the lower limit to Condition (14) is set at no less than 3.0, it makes sure the imaging optical system has an axial length as desired, working in favor of achieving the function of staying the exit pupil away from the image plane while making sure optical performance.

On the other hand, it is preferable to set the upper limit to Condition (14) at no greater than 10.0, because size reductions are then achievable.

For the invention, it is preferable to satisfy the following condition (15).

$$2.0 \leq fb/IH\omega 30 \leq 4.0 \qquad (15)$$

where fb is the back focus of the imaging optical system upon focusing on an object point at infinity, said back focus being the length, as calculated on an air basis, from the image-side refracting surface of the lens located on the closest to image side in the rear lens group to the imaging plane, and IHω30 is the height of the imaging optical system, as measured from the optical axis, at a point of intersection with the imaging plane of a chief ray incident at an angle of view of 30 degrees on the imaging optical system upon focusing on an object point at infinity.

As the lower limit to Condition (15) is set at no less than 2.0, it prevents the lens surface located on the closest to image side from drawing too close to the imaging plane and the diameter of the lens surface located on the closest to image side from growing large, working in favor of reducing the size of the optical system.

As the upper limit to Condition (15) is set at no greater than 4.0, on the other hand, it places some limitation on the back focus so that even when the whole length of the optical system is shortened and the exit angle of off-axis rays is diminished, it is possible to make sure enough space to receive the rear lens group (LR) of positive refracting power, working in favor of making sure sufficient optical performance in view of correction of aberrations.

These imaging optical systems may be effectively used on imaging apparatus such as digital cameras because the exit pupil is easily stayed away from the image plane with achievement of high performance.

The present invention provides an imaging apparatus comprising an imaging optical system and an imaging device located on the image side of the imaging optical system to convert an optical image into electrical signals, wherein any one of the aforesaid imaging optical system is preferably used as that imaging optical system.

For the invention, a plurality of the aforesaid requirements should be satisfied at the same time as occasion may be.

If the lower and upper limits to the respective conditions are preferably set as follows, the advantages of the invention will then be more prominent.

To Condition (1), the lower limit is set at 1.20 or 1.25, more preferably 1.29, and the upper limit is set at 1.5, more preferably 1.45.

To Condition (2), the lower limit is set at −3.5, more preferably −3.3, and the upper limit is set at −1.4, more preferably −1.6.

To Condition (3), the lower limit is set at −3.0, more preferably −2.7, and the upper limit is set at −0.9, more preferably −1.0.

To Condition (4), the lower limit is set at 2.0, more preferably 2.5, and the upper limit is set at 5.0, more preferably 4.5.

To Condition (5), the lower limit is set at −2.3, more preferably −2.0, and the upper limit is set at −0.75, more preferably −0.9.

To Condition (6), the lower limit is set at −1.8, more preferably −1.3, and the upper limit is set at −0.45, more preferably −0.55.

To Condition (7), the lower limit is set at −20%, more preferably −15%, and the upper limit is set at −8%, more preferably −9%.

To Condition (8), the lower limit is set at 1.8, more preferably 2.0, and the upper limit is set at 7.0, more preferably 5.5.

To Condition (9), the lower limit is set at 1.5, more preferably 1.6, and the upper limit is set at 5.0, more preferably 4.0.

To Condition (10), the lower limit is set at 1.2, more preferably 1.3, and the upper limit is set at 5.0, more preferably 4.0.

To Condition (11), the lower limit is set at −1.3, more preferably −1.2, and the upper limit is set at −0.6, more preferably −0.7.

To Condition (12), the lower limit is set at −3.5, more preferably −3.0, and the upper limit is set at −0.25, more preferably −0.45.

To Condition (13), the upper limit is set at 0.25, more preferably 0.23. There may be the lower limit set at no less than 0.05, more preferably no less than 0.08 at which refraction may be ensured through an air lens sandwiched between multiple lenses.

To Condition (14), the lower limit is set at 4.0, more preferably 5.0, and the upper limit is set at 9.0, more preferably 8.5.

To Condition (15), the lower limit is set at 2.2, more preferably 2.4, and the upper limit is set at 3.5, more preferably at 3.0.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Examples 1 to 7 of the invention are now explained.

Figure 1:
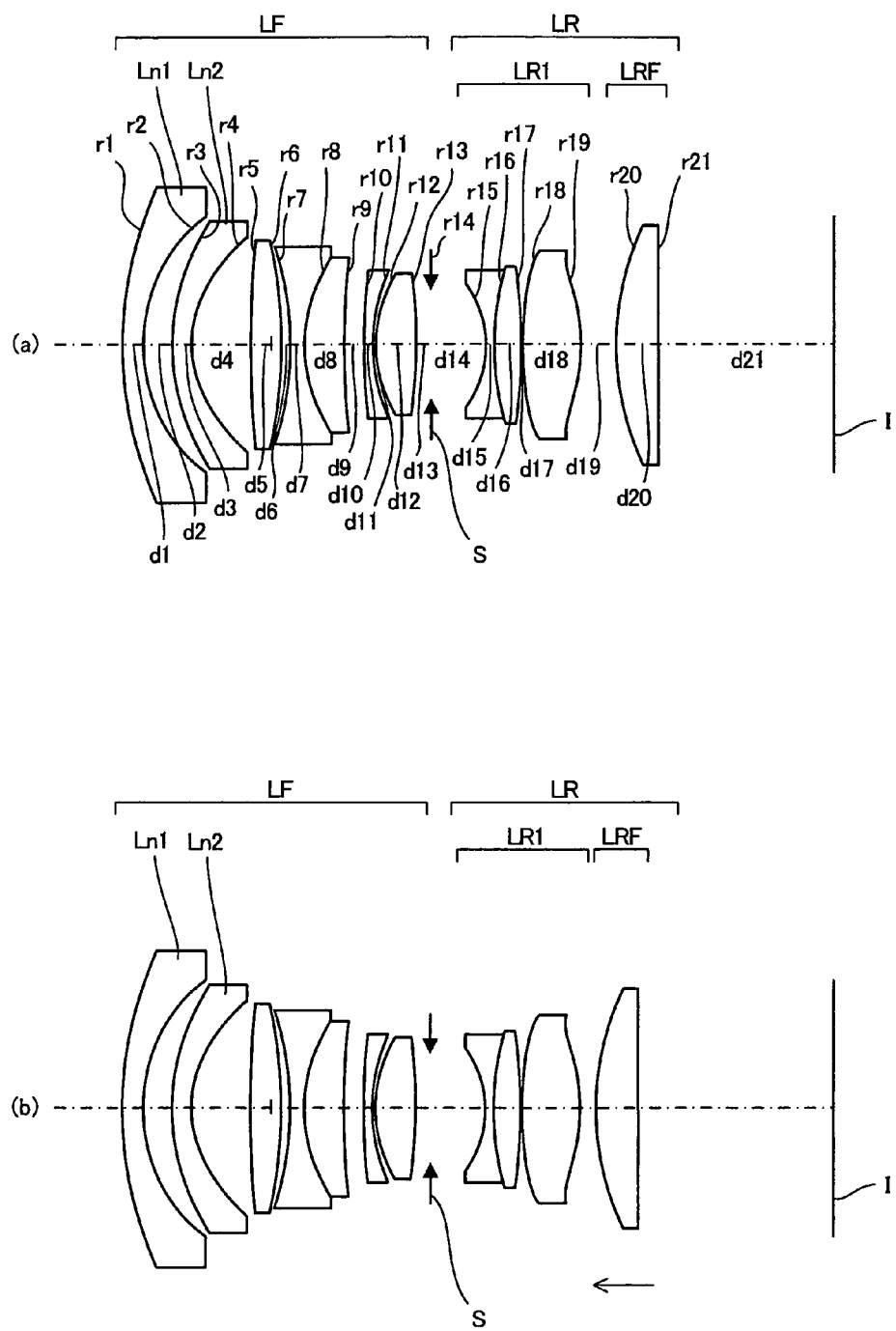
FIG. 1 is illustrative in section of the optical system according to Example 1.

FIG. 1 is illustrative in section of the optical system according to Example 1. Note here that FIG. 1(a) shows the optical system upon focusing on infinity, and FIG. 1(b) shows the optical system at IO 20 cm.

As depicted in FIG. 1, the optical system of Example 1 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens LN1 convex on its object side, the second negative meniscus lens Ln2 convex on its object side, a double-convex positive lens, a cemented lens of a double-concave negative lens and a positive meniscus lens convex on its object side, a negative meniscus lens convex on its object side, and a double-convex positive lens.

The rear lens group LR is made up of, in order from the object side, a cemented lens of a double-concave negative lens and a double-convex positive lens, a double-convex positive lens, and a double-convex positive lens. The lens subgroup LR1 is made up of a part of the rear lens group: the cemented lens of a double-concave negative lens and a double-convex positive lens, and the double-convex positive lens on the object side. The focus lens group LRF is made up of the double-convex positive lens located on the closest to image side. I is the image plane.

Four aspheric surfaces are used: two at both surfaces of the second negative meniscus lens Ln2 in the front lens group LF, and two at both surfaces of the double-convex positive lens in the lens subgroup LR1 of the rear lens group LR.

Figure 2:
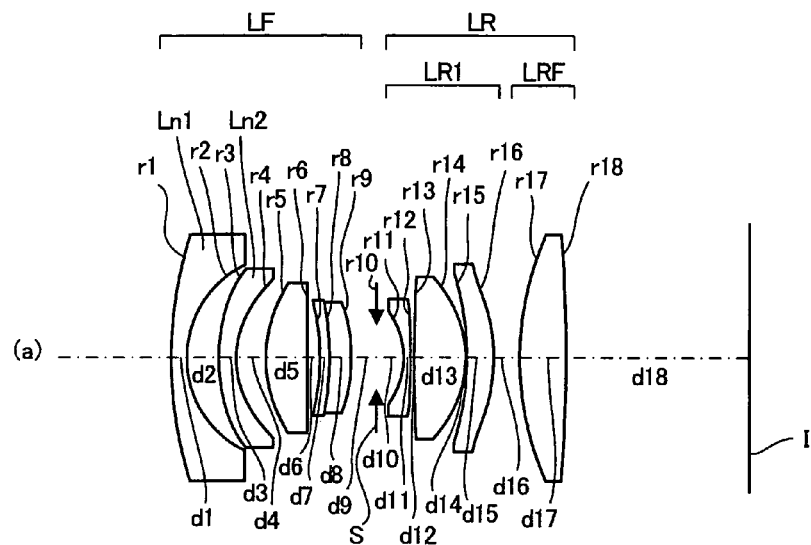
FIG. 2 is illustrative in section of the optical system according to Example 2.
Figure 2:
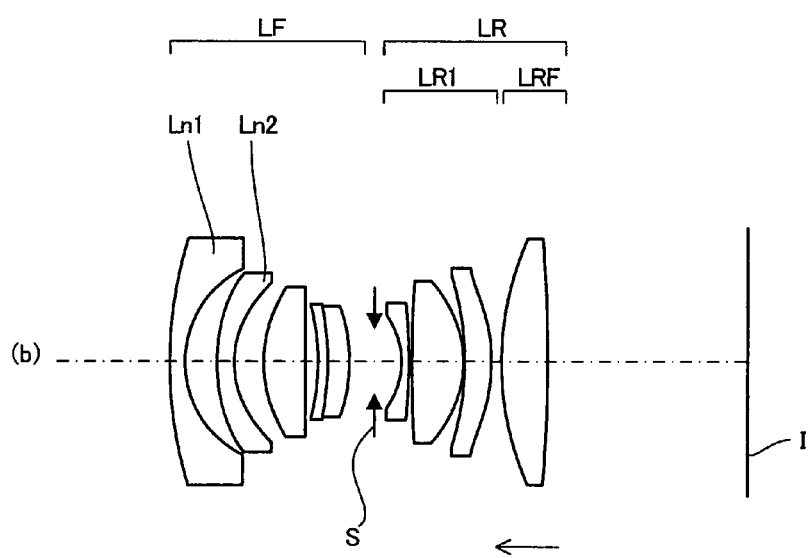

FIG. 2 is illustrative in section of the optical system according to Example 2. Note here that FIG. 2(a) shows the optical system upon focusing on infinity, and FIG. 2(b) shows the optical system at IO 20 cm.

As depicted in FIG. 2, the optical system of Example 2 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens Ln1 convex on its object side, the second negative meniscus lens Ln2 convex on its object side, a double-convex positive lens, and a cemented lens of a negative meniscus lens convex on its image side and a positive meniscus lens convex on its image side.

The rear lens group LR is made up of, in order from the object side, a negative meniscus lens convex on its image side, a double-convex positive lens, a positive meniscus lens convex on its image side, and a double-convex positive lens. The lens subgroup LR1 is made up of a part of the rear lens group LR: the negative meniscus lens convex on its image side, the double-convex positive lens, and the positive meniscus lens convex on its image side. The focus lens group LRF is made up of the double-convex positive lens located on the closest to image plane side. I is the image plane.

Four aspheric surfaces are used: two at both surfaces of the second negative meniscus lens Ln2 in the front lens group LF, and two at both surface of the positive meniscus lens convex on its image side in the lens subgroup LR1 of the rear lens group LR. For the double-convex positive lens in the focus lens group LRF, a cycloolefin polymer material of low hygroscopicity and reduced weight is used.

Figure 3:
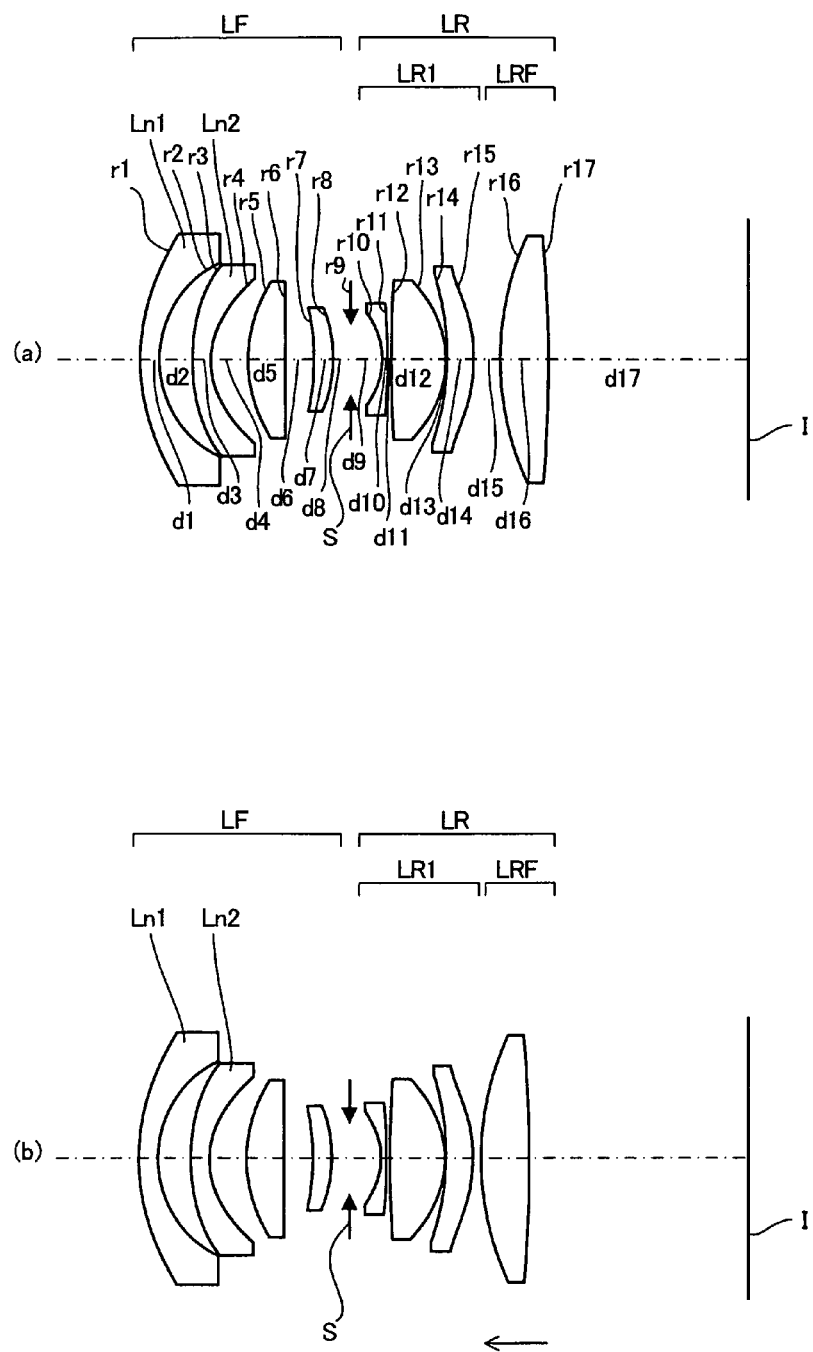
FIG. 3 is illustrative in section of the optical system according to Example 3.

FIG. 3 is illustrative in section of the optical system according to Example 3. Note here that FIG. 3(a) shows the optical system upon focusing on infinity, and FIG. 3(b) shows the optical system at IO 20 cm.

As depicted in FIG. 3, the optical system of Example 3 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens Ln1 convex on its object side, the second negative meniscus lens Ln2 convex on its object side, a positive meniscus lens convex on its object side, and a positive meniscus lens convex on its image side.

The rear lens group LR is made up of, in order from the object side, a negative meniscus lens convex on its image side, a double-convex positive lens, a positive meniscus lens convex on its image side, and a double-convex positive lens. The lens subgroup LR1 is made up of a part of the rear lens group LR: the negative meniscus lens convex on its image side, the double-convex positive lens, and the positive meniscus lens convex on its image side. The focus lens group LRF is made up of the double-convex positive lens on the closest to image side. I is the image plane.

Three aspheric surfaces are used: one at the image-side surface of the second negative meniscus lens Ln2 in the front lens group LF, and two at both surfaces of the positive meniscus lens convex on its image side in the lens subgroup LR1 of the rear lens group LR. For the double-convex positive lens in the focus lens group LRF, a cycloolefin polymer material of low hygroscopicity and reduced weight is used.

Figure 4:
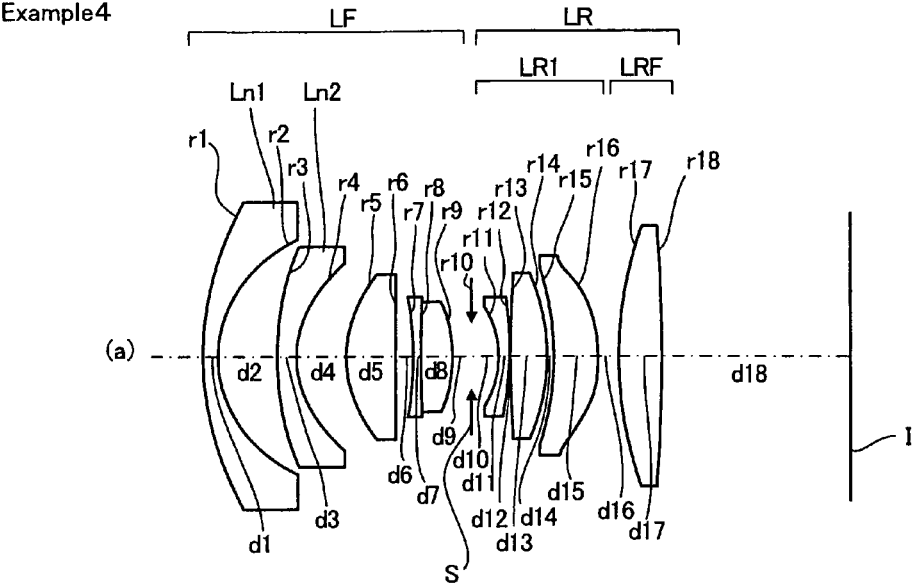
FIG. 4 is illustrative in section of the optical system according to Example 4.
Figure 4:
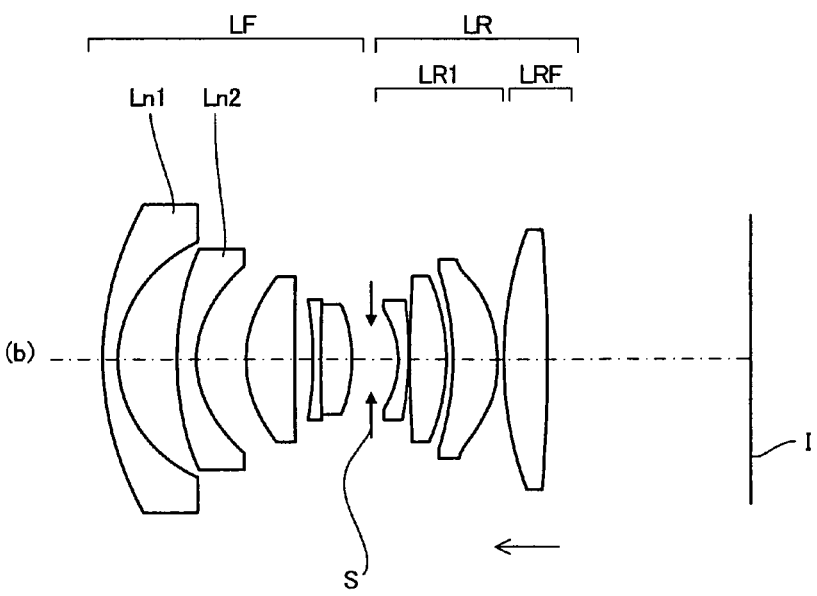

FIG. 4 is illustrative in section of the optical system according to Example 4. Note here that FIG. 4(a) shows the optical system upon focusing on infinity, and FIG. 4(b) shows the optical system at IO 20 cm.

As depicted in FIG. 4, the optical system of Example 4 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens Ln1 convex on its object side, the second negative meniscus lens Ln2 convex on its object side, a positive meniscus lens convex on its object side, and a cemented lens of a double-concave negative lens and a double-convex positive lens.

The rear lens group LR is made up of, in order from the object side, a double-convex positive lens, a positive meniscus lens convex on its image side, and a double-convex positive lens. The lens subgroup LR1 is made up of a part of the rear lens group LR: the negative meniscus lens convex on its image side, the double-convex positive lens, and the positive meniscus lens convex on its image side. The focus lens group LRF is made up of the double-convex positive lens on the closest to image side. I is the image plane.

Four aspheric surfaces are used: two at both surfaces of the second negative meniscus lens Ln2 in the front lens group LF, and two at both surfaces of the positive meniscus lens convex on its image side in the lens subgroup LR1 of the rear lens group LR.

Figure 5:
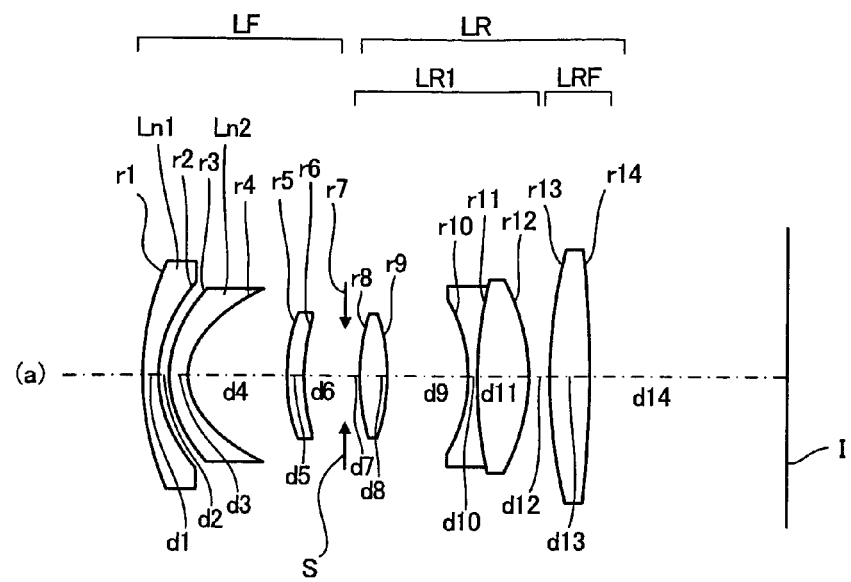
FIG. 5 is illustrative in section of the optical system according to Example 5.
Figure 5:
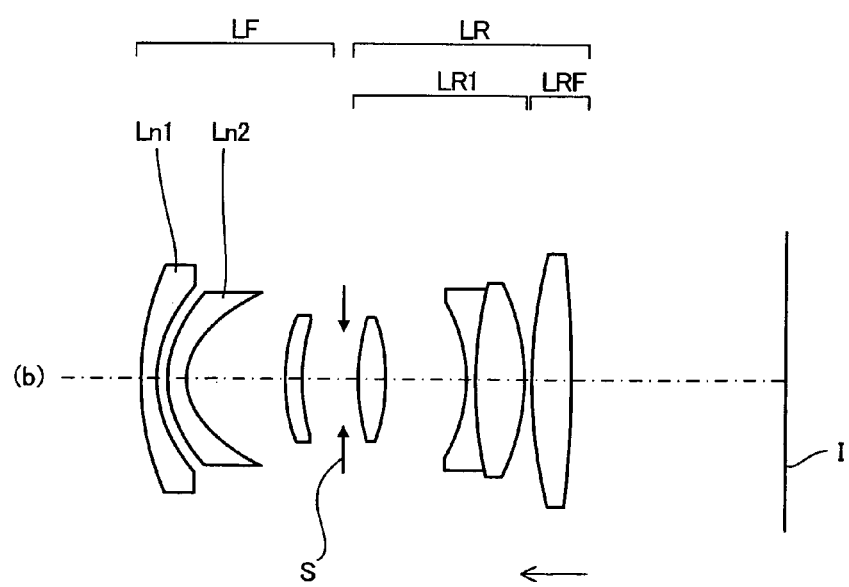

FIG. 5 is illustrative in section of the optical system according to Example 5. Note here that FIG. 5(a) shows the optical system upon focusing on infinity, and FIG. 5(b) shows the optical system at IO 20 cm.

As depicted in FIG. 5, the optical system of Example 5 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens Ln1 convex on its object side, the second negative meniscus lens Ln2 convex on its object side, and a positive meniscus lens convex on its object side.

The rear lens group LR is made up of, in order from the object side, a double-convex positive lens, a cemented lens of a double-concave negative lens and a double-convex positive lens, and a double-convex positive lens. The lens subgroup LR1 is made up of a part of the rear lens group LR: the double-convex positive lens, and the cemented lens of a double-concave negative lens and a double-convex positive lens. The focus lens group LRF is made up of the double-convex positive lens on the closest to image side. I is the image plane.

Three aspheric surfaces are used: two at both surfaces of the second negative meniscus lens Ln2 in the front lens group LF, and one at the surface on the closest to image side of the cemented lens in the lens subgroup LR1 of the rear lens group LR.

Figure 6:
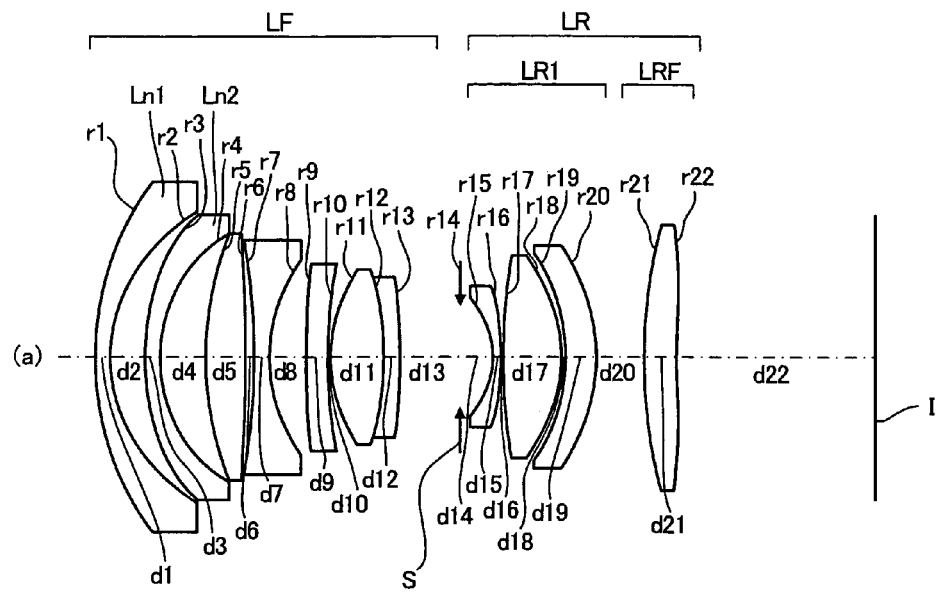
FIG. 6 is illustrative in section of the optical system according to Example 6.
Figure 6:
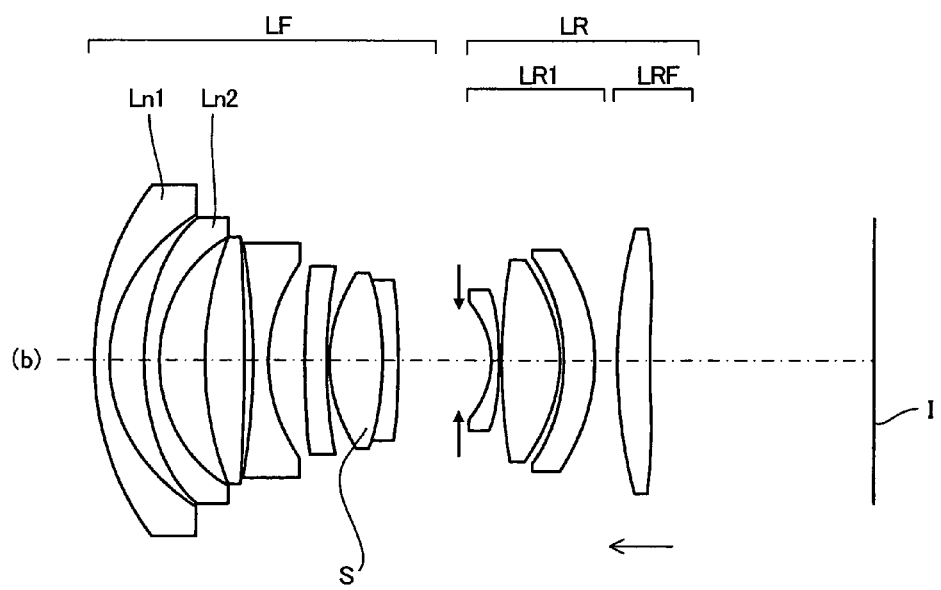

FIG. 6 is illustrative in section of the optical system according to Example 6. Note here that FIG. 6(a) shows the optical system upon focusing on infinity, and FIG. 6(b) shows the optical system at IO 20 cm.

As depicted in FIG. 6, the optical system of Example 6 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens convex on its object side, the second negative meniscus lens convex on its object side, a double-convex positive lens, a double-concave negative lens, a negative meniscus lens convex on its object side, and a cemented lens of a double-convex positive lens and a negative meniscus lens convex on its image side.

The rear lens group LR is made up of, in order from the object side, a negative meniscus lens convex on its image side, a double-convex positive lens, a positive meniscus lens convex on its image side, and a positive meniscus lens convex on its object side. The lens subgroup LR1 is made up of a part of the rear lens group LR: the negative meniscus lens convex on its image side, the double-convex positive lens, and the positive meniscus lens convex on its image side. The focus lens group LRF is made up of the positive meniscus lens that is located on the closest to image plane side and convex on its object side. I is the image plane.

Six aspheric surfaces are used: two at both surfaces of the second negative meniscus lens Ln2 in the front lens group LF, two at both surfaces of the positive meniscus lens that is located in the lens subgroup LR1 of the rear lens group LR and convex on its image side, and two at both surface of the positive meniscus lens that is located in the focus lens group LRF and convex on its object side.

Figure 7:
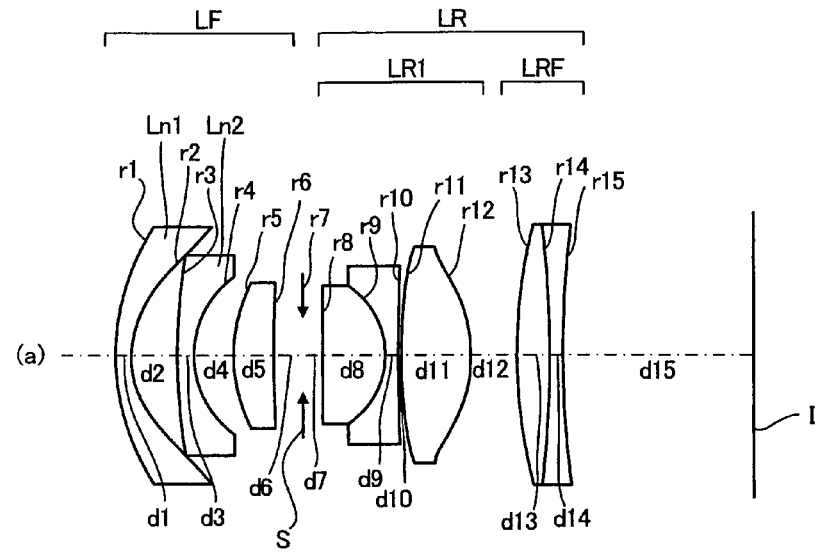
FIG. 7 is illustrative in section of the optical system according to Example 7.
Figure 7:
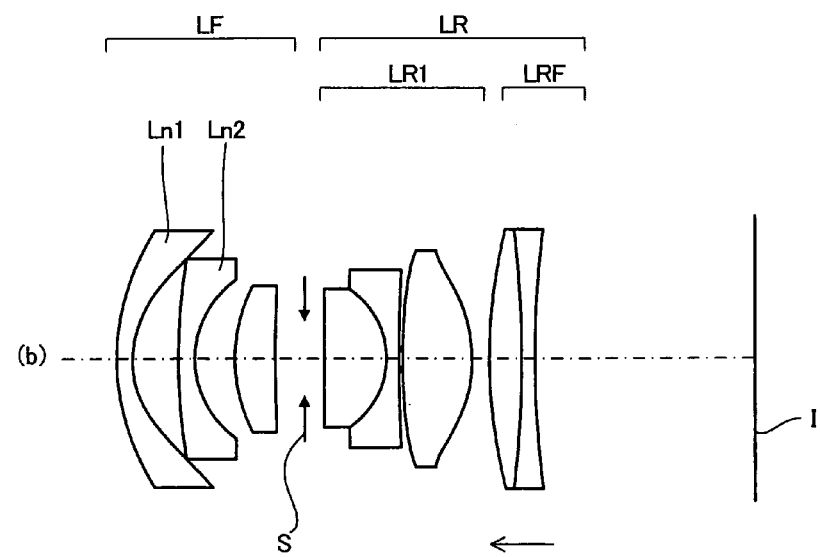
Figure 8:
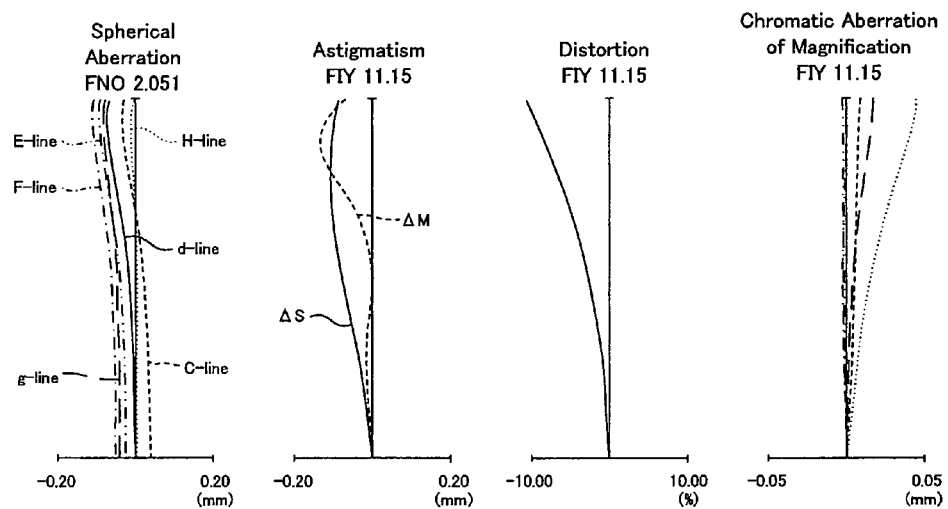
FIG. 8 is an aberration diagrams for various aberrations of the optical system according to Example 1 upon focusing at infinity.
Figure 9:
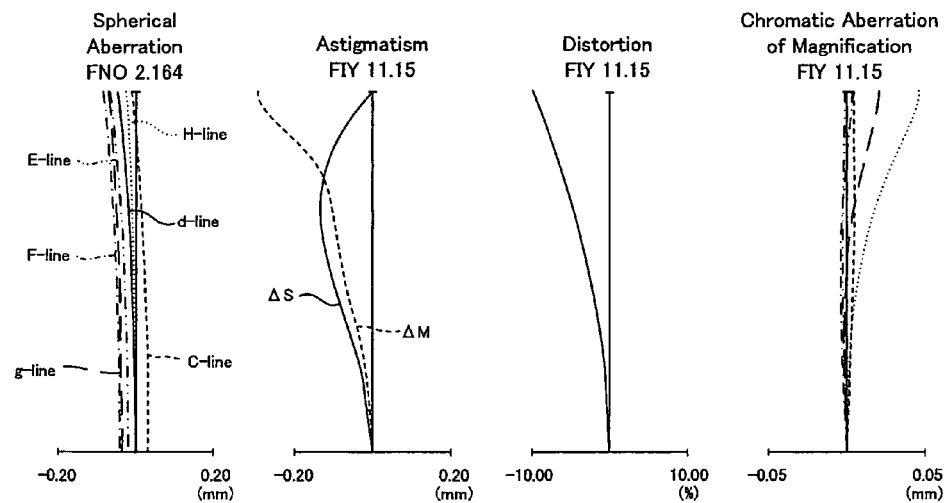
FIG. 9 is an aberration diagrams for various aberrations of the optical system according to Example 2 upon focusing at infinity.
Figure 10:
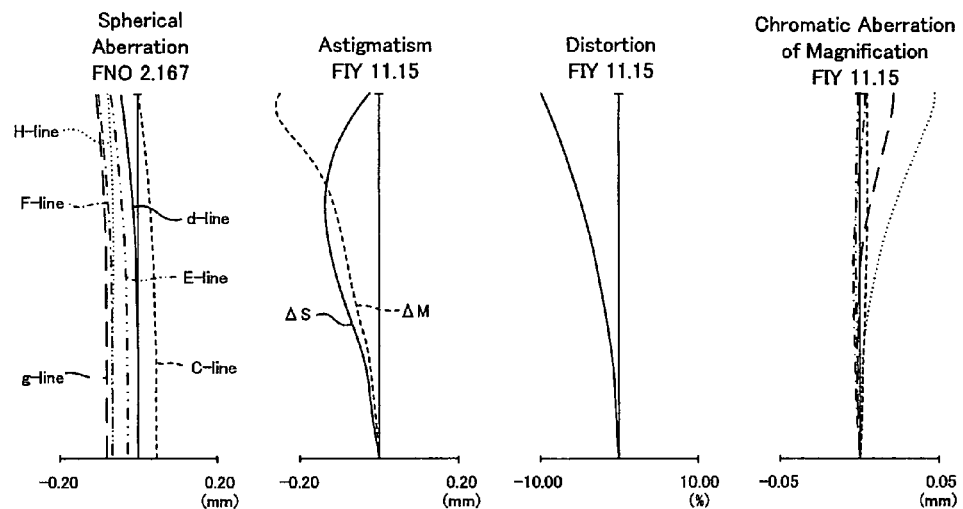
FIG. 10 is an aberration diagrams for various aberrations of the optical system according to Example 3 upon focusing at infinity.
Figure 11:
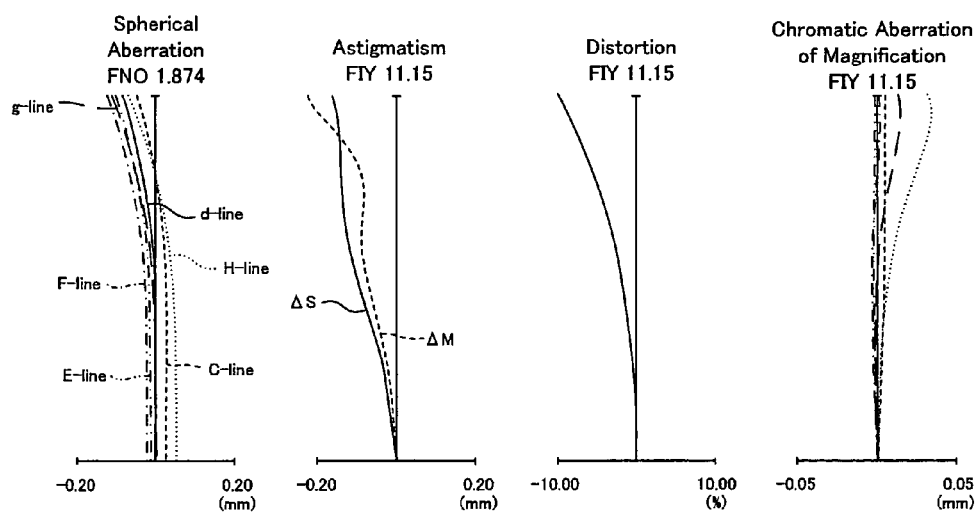
FIG. 11 is an aberration diagrams for various aberrations of the optical system according to Example 4 upon focusing at infinity.
Figure 12:
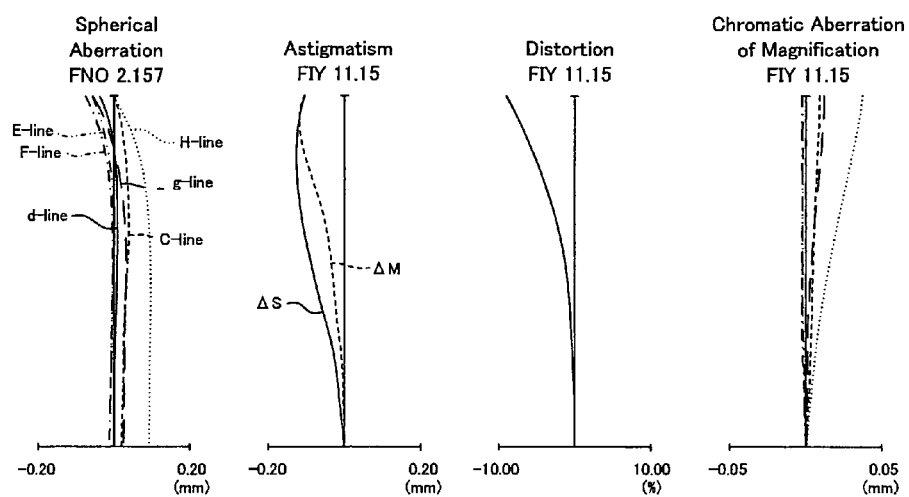
FIG. 12 is an aberration diagrams for various aberrations of the optical system according to Example 5 upon focusing at infinity.
Figure 13:
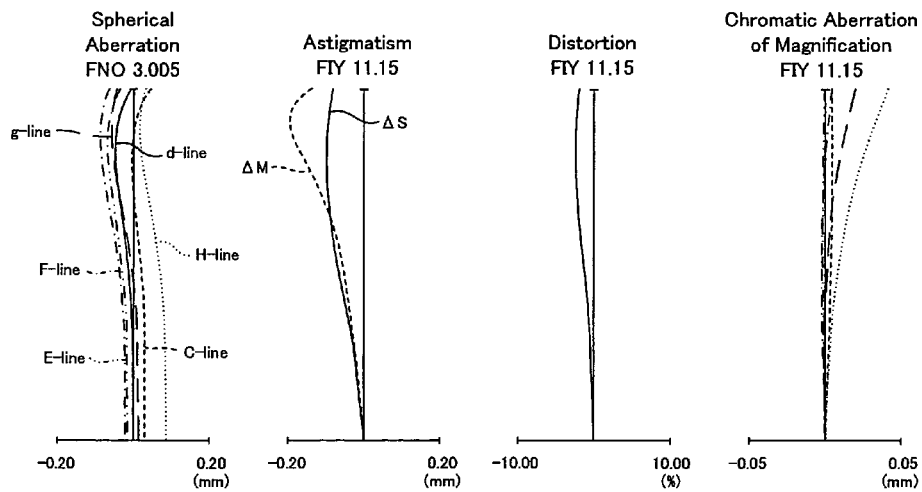
FIG. 13 is an aberration diagrams for various aberrations of the optical system according to Example 6 upon focusing at infinity.
Figure 14:
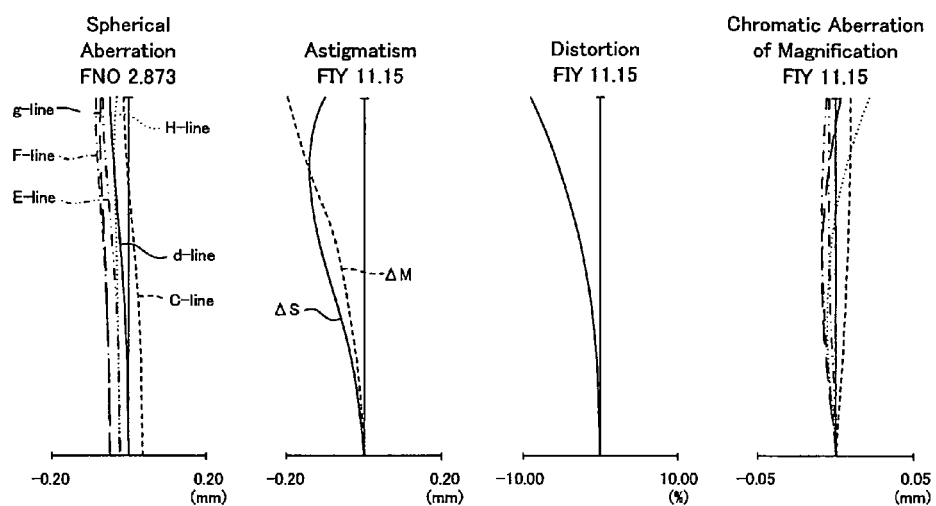
FIG. 14 is an aberration diagrams for various aberrations of the optical system according to Example 7 upon focusing at infinity.

FIG. 7 is illustrative in section of the optical system according to Example 7. Note here that FIG. 7(a) shows the optical system upon focusing on infinity, and FIG. 7(b) shows the optical system at IO 20 cm.

As depicted in FIG. 7, the optical system of Example 7 is built up of, in order from the object side to the image side, the front lens group LF having negative refracting power, the aperture stop S, and the rear lens group LR having positive refracting power. The rear lens group LR is made up of the lens subgroup LR1 having positive refracting power, and the focus lens group LRF having positive refracting power.

The front lens group LF is made up of, in order from the object side, the first negative meniscus lens Ln1 convex on its object side, the second negative meniscus lens Ln1 convex on its object side, and a positive meniscus lens convex on its object side.

The rear lens group LR is made up of, in order from the object side, a cemented lens of a positive meniscus lens convex on its image side and a double-concave negative lens, a double-convex positive lens, and a cemented lens of a double-convex positive lens and a double-concave negative lens. The lens subgroup LR1 is made up of a part of the rear lens group LR: the cemented lens of a positive meniscus lens convex on its image side and a double-concave negative lens, and a double-convex positive lens. The focus lens group LRF is made up of the cemented lens of a double-convex positive lens and a double-concave negative lens. I is the image plane.

Four aspheric surfaces are used: two at both surfaces of the first negative meniscus lens Ln1 in the front lens group LF, and two at both surfaces of the double-convex positive lens in the lens subgroup LR1 of the rear lens group LR.

Set out below are numerical data on Examples 1 to 7, in which r is the radius of curvature of each lens surface; d is the lens thickness or air spacing; Nd and vd are the d-line ($\lambda$=587.6 nm) refractive index and Abbe constant, respectively; f is the focal length; Fno is the F-number; and $\omega$ is the half angle of view (°).

In the tables of specifications, the surface with (aspheric) annexed to it stands for a surface of aspheric shape. Aspheric surface shape is given by the following equation (9).

$$X(H) = (H^2/r) / \{1 + [1-(1+K) \cdot (H^2/r^2)]^{1/2}\} + A4H^4 + A6H^6 + A8H^8 + A10H^{10} + A12H^{12}$$

where H is the height vertical to the optical axis, X(H) is the amount of displacement at the height H in the optical axis direction with the apex as origin, r is the paraxial radius of curvature, and A2, A4, A6, A8, A10, and A12 is the $2^{nd}$, $4^{th}$, $6^{th}$, $8^{th}$, $10^{th}$, and $12^{th}$ order aspheric coefficients, respectively.

Numerical Example 1
Unit mm

Surface Data

| Surface No. | r | d | nd | vd |
|---|---|---|---|---|
| 1 | 33.689 | 1.750 | 1.78590 | 44.20 |
| 2 | 14.086 | 2.476 | | |
| 3 | 17.166 | 1.700 | 1.67790 | 55.34 |
| 4 | 9.445 | 4.947 | | |
| 5 | 92.675 | 2.740 | 1.88300 | 40.80 |
| 6 | −40.381 | 0.635 | | |
| 7 | −27.836 | 1.200 | 1.48749 | 70.23 |
| 8 | 13.649 | 3.437 | 1.72151 | 29.23 |
| 9 | 82.751 | 1.645 | | |
| 10 | 52.005 | 0.900 | 1.76182 | 26.52 |
| 11 | 17.076 | 0.189 | | |
| 12 | 12.054 | 3.382 | 1.69700 | 48.52 |
| 13 | −43.211 | 1.134 | | |
| 14 (Stop) | ∞ | 4.730 | | |
| 15 | −8.981 | 0.800 | 1.80518 | 25.42 |
| 16 | 28.124 | 2.284 | 1.88300 | 40.80 |
| 17 | −41.231 | 0.150 | | |
| 18 | 56.295 | 4.921 | 1.74320 | 49.34 |
| 19 | −14.456 | L1 | | |
| 20 | 25.519 | 3.571 | 1.51742 | 52.43 |
| 21 | −1000.000 | L2 | | |
| Image Plane | ∞ | | | |

Aspheric Data

3rd Surface

K = −0.5882, A4 = −3.2612E−005, A6 = 1.3916E−007,
A8 = −1.3823E−009, A10 = 6.9311E−012

4th Surface

K = −0.2345, A4 = −1.0137E−004, A6 = −1.7688E−007,
A8 = −1.1612E−008, A10 = 1.2299E−010, A12 = −8.6949E−013

18th Surface

K = −38.9070, A4 = 7.1773E−005, A6 = 1.7227E−006,
A8 = −1.3823E−009, A10 = 6.9311E−012

19th Surface

K = −2.6656, A4 = 6.5273E−007, A6 = 1.7649E−006,
A8 = 2.5620E−009, A10 = 1.6732E−010, A12 = 6.6546E−013

| | Infinity | IO = 20 cm |
|---|---|---|
| L1 | 3.0348 | 1.4977 |
| L2 | 15.0407 | 16.679 |

Various Data

| | |
|---|---|
| f (mm) | 12.187 |
| Fno | 2.051 |

Numerical Example 1
Unit mm

| | |
|---|---|
| 2ω (Angle of View (°)) | 91.2 |
| FB (mm) | 15.041 |
| Whole Length (mm) | 60.667 |

Numerical Example 2
Unit mm

Surface Data

| Surface No. | r | d | nd | vd |
|---|---|---|---|---|
| 1 | 33.391 | 1.300 | 1.58913 | 61.14 |
| 2 | 8.700 | 2.563 | | |
| 3 | 14.957 | 1.500 | 1.53113 | 55.80 |
| 4 | 7.763 | 2.402 | | |
| 5 | 11.415 | 3.370 | 1.90366 | 31.32 |
| 6 | −12810.386 | 1.128 | | |
| 7 | −18.543 | 0.700 | 1.84666 | 23.78 |
| 8 | −30.437 | 1.869 | 1.48749 | 70.23 |
| 9 | −13.512 | 2.056 | | |
| 10 (Stop) | ∞ | 2.201 | | |
| 11 | −6.924 | 0.700 | 1.84666 | 23.78 |
| 12 | −41.871 | 0.100 | | |
| 13 | 115.593 | 4.268 | 1.72916 | 54.68 |
| 14 | −10.030 | 0.100 | | |
| 15 | −26.464 | 2.250 | 1.53113 | 55.80 |
| 16 | −13.646 | L1 | | |
| 17 | 25.463 | 3.821 | 1.53113 | 55.80 |
| 18 | −121.573 | L2 | | |
| Image Plane | ∞ | | | |

Aspheric Data

3rd Surface

K = 0.0000, A4 = 1.6516E−004, A6 = −1.8552E−006, A8 = 9.3914E−009

4th Surface

K = 0.0000, A4 = −3.9730E−005, A6 = −5.5610E−006, A8 = −1.4707E−008, A10 = −6.1975E−010

15th Surface

K = 0.0000, A4 = −8.4240E−005, A6 = 1.1973E−006, A8 = −3.8484E−010

16th Surface

K = 0.0000, A4 = 5.5262E−005, A6 = 1.9772E−006, A8 = −9.1438E−009, A10 = 4.4737E−010, A12 = −3.7042E−012

| | Infinity | I0 = 20 cm |
|---|---|---|
| L1 | 2.17158 | 0.81998 |
| L2 | 15.0918 | 16.4434 |

Various Data

| | |
|---|---|
| f (mm) | 12.284 |
| Fno | 2.838 |
| 2ω (Angle of View (°)) | 90.4 |
| FB (mm) | 15.092 |
| Whole Length (mm) | 47.592 |

Numerical Example 3
Unit mm

Surface Data

| Surface No. | r | d | nd | vd |
|---|---|---|---|---|
| 1 | 18.991 | 1.300 | 1.74100 | 52.64 |
| 2 | 8.700 | 2.813 | | |
| 3 | 15.201 | 1.500 | 1.49700 | 81.54 |
| 4 | 7.248 | 2.820 | | |
| 5 | 12.268 | 2.842 | 1.90366 | 31.32 |
| 6 | 105.059 | 2.275 | | |
| 7 | −18.650 | 1.640 | 1.48749 | 70.23 |
| 8 | −11.455 | 1.263 | | |
| 9 (Stop) | ∞ | 2.207 | | |
| 10 | −6.945 | 0.700 | 1.84666 | 23.78 |
| 11 | −59.552 | 0.100 | | |
| 12 | 109.913 | 4.256 | 1.72916 | 54.68 |
| 13 | −9.978 | 0.100 | | |
| 14 | −22.042 | 2.250 | 1.53113 | 55.80 |
| 15 | −12.471 | L1 | | |
| 16 | 24.893 | 3.806 | 1.53113 | 55.80 |
| 17 | −137.292 | L2 | | |
| Image Plane | ∞ | | | |

Aspheric Data

4th Surface

K = 0.0000, A4 = −2.3503E−004, A6 = −5.0402E−006, A8 = 4.6076E−008, A10 = −1.8927E−009

14th Surface

K = 0.0000, A4 = −7.6376E−005, A6 = 2.4694E−006, A8 = −7.1225E−009

15th Surface

K = 0.0000, A4 = 5.5064E−005, A6 = 2.7701E−006, A8 = −1.3255E−008, A10 = 6.3187E−010, A12 = −5.5319E−012

| | Infinity | I0 = 20 cm |
|---|---|---|
| L1 | 2.1283 | 0.81692 |
| L2 | 15.9041 | 17.2155 |

Various Data

| | |
|---|---|
| f (mm) | 12.287 |
| Fno | 2.835 |
| 2ω (Angle of View (°)) | 90.4 |
| FB (mm) | 15.904 |
| Whole Length (mm) | 47.904 |

Numerical Example 4
Unit mm

Surface Data

| Surface No. | r | d | nd | vd |
|---|---|---|---|---|
| 1 | 24.929 | 1.300 | 1.58913 | 61.14 |
| 2 | 9.904 | 4.536 | | |
| 3 | 35.300 | 1.500 | 1.49700 | 81.54 |
| 4 | 8.309 | 3.804 | | |
| 5 | 10.730 | 3.703 | 1.90366 | 31.32 |
| 6 | 113.647 | 1.241 | | |
| 7 | −33.764 | 0.700 | 1.80810 | 22.76 |
| 8 | 91.774 | 2.189 | 1.48749 | 70.23 |
| 9 | −15.848 | 1.763 | | |
| 10 (Stop) | ∞ | 2.242 | | |
| 11 | −6.274 | 0.700 | 1.84666 | 23.78 |
| 12 | −24.483 | 0.100 | | |
| 13 | 334.732 | 2.896 | 1.72916 | 54.68 |
| 14 | −15.781 | 0.100 | | |
| 15 | −34.786 | 3.851 | 1.58913 | 61.14 |
| 16 | −9.163 | L1 | | |
| 17 | 33.907 | 3.312 | 1.72916 | 54.68 |
| 18 | −200.000 | L2 | | |
| Image Plane | ∞ | | | |

Numerical Example 4
Unit mm

Aspheric Data

3rd Surface

K = 0.0000, A4 = 2.0831E−004, A6 = −2.8865E−006, A8 = 1.4553E−008
4th Surface

K = 0.0000, A4 = 5.3524E−006, A6 = −1.0573E−006,
A8 = −1.0958E−007, A10 = 9.0487E−010
15th Surface K = 0.0000, A4 = −1.5448E−004, A6 = 2.4159E−006,
A8 = −8.1475E−009
16th Surface K = 0.0000, A4 = 1.0917E−004, A6 = 4.1350E−009, A8 = 5.6916E−008,
A10 = −3.5194E−010, A12 = 3.6760E−012

|    | Infinity | I0 = 20 cm |
|----|----------|------------|
| L1 | 1.56416  | 0.48612    |
| L2 | 14.53567 | 15.61372   |

Various Data

| f (mm)              | 10.711 |
|---------------------|--------|
| Fno                 | 2.857  |
| 2ω (Angle of View (°)) | 98.3   |
| FB (mm)             | 14.536 |
| Whole Length (mm)   | 50.036 |

Numerical Example 5
Unit mm

Surface Data

| Surface No. | r       | d     | nd      | vd    |
|-------------|---------|-------|---------|-------|
| 1           | 22.054  | 1.300 | 1.48749 | 70.23 |
| 2           | 10.173  | 0.669 |         |       |
| 3           | 7.579   | 1.500 | 1.51633 | 64.14 |
| 4           | 4.500   | 7.473 |         |       |
| 5           | 14.326  | 1.381 | 1.80518 | 25.42 |
| 6           | 16.510  | 2.988 |         |       |
| 7 (Stop)    | ∞       | 1.000 |         |       |
| 8           | 16.505  | 2.175 | 1.56384 | 60.67 |
| 9           | −16.018 | 6.001 |         |       |
| 10          | −12.667 | 0.800 | 1.84666 | 23.78 |
| 11          | 38.302  | 3.728 | 1.69350 | 53.21 |
| 12          | −12.953 | L1    |         |       |
| 13          | 40.714  | 3.035 | 1.88300 | 40.76 |
| 14          | −96.244 | L2    |         |       |
| Image Plane | ∞       |       |         |       |

Aspheric Data

3rd Surface

K = −0.4762, A4 = −6.5417E−005, A6 = −4.1244E−006,
A8 = 2.8294E−009
4th Surface

K = −0.8336, A4 = 3.4152E−004, A6 = −4.1284E−006,
A8 = 1.1244E−007, A10 = −6.1611E−009,
A12 = 1.0339E−010
12th Surface K = −1.0884, A4 = 5.1215E−005, A6 = 6.2967E−007,
A8 = 8.1825E−009, A10 = 2.3403E−011, A12 = −2.8727E−013

Numerical Example 5
Unit mm

|    | Infinity | I0 = 20 cm |
|----|----------|------------|
| L1 | 1.56610  | 0.32377    |
| L2 | 14.76722 | 16.00956   |

Various Data

| f (mm)              | 12.290 |
|---------------------|--------|
| Fno                 | 2.848  |
| 2ω (Angle of View (°)) | 89.9   |
| FB (mm)             | 14.767 |
| Whole Length (mm)   | 48.3822 |

Numerical Example 6
Unit mm

Surface Data

| Surface No. | r        | d     | nd      | vd    |
|-------------|----------|-------|---------|-------|
| 1           | 23.888   | 1.300 | 1.80400 | 46.57 |
| 2           | 13.300   | 2.701 |         |       |
| 3           | 30.475   | 1.300 | 1.49700 | 81.54 |
| 4           | 13.514   | 3.400 |         |       |
| 5           | 26.549   | 3.172 | 1.84666 | 23.78 |
| 6           | −290.740 | 0.645 |         |       |
| 7           | −54.653  | 1.200 | 1.48749 | 70.23 |
| 8           | 12.835   | 3.088 |         |       |
| 9           | 318.454  | 1.500 | 1.84666 | 23.78 |
| 10          | 37.885   | 0.100 |         |       |
| 11          | 12.537   | 4.305 | 1.83481 | 42.71 |
| 12          | −23.549  | 1.200 | 1.84666 | 23.78 |
| 13          | −73.992  | 4.623 |         |       |
| 14 (Stop)   | ∞        | 2.481 |         |       |
| 15          | −7.009   | 0.700 | 1.84666 | 23.78 |
| 16          | −22.317  | 0.100 |         |       |
| 17          | 46.601   | 4.766 | 1.74100 | 52.64 |
| 18          | −12.635  | 0.100 |         |       |
| 19          | −15.255  | 2.700 | 1.80139 | 45.45 |
| 20          | −11.663  | L1    |         |       |
| 21          | 26.342   | 2.634 | 1.58913 | 61.14 |
| 22          | 85.000   | L2    |         |       |
| Image Plane | ∞        |       |         |       |

Aspheric Data

3rd Surface

K = 0.0000, A4 = 1.5994E−004, A6 = −1.1162E−006,
A8 = 5.9731E−009, A10 = −4.8178E−012
4th Surface K = 0.0000, A4 = 1.3056E−004, A6 = −6.6759E−007,
A8 = −3.3742E−009, A10 = 6.3499E−011
19th Surface K = 0.0000, A4 = −4.3195E−005, A6 = 6.1923E−007,
A8 = 2.9149E−008, A10 = −3.7518E−010
20th Surface K = 0.0000, A4 = 8.1887E−005, A6 = 7.9579E−007, A8 = 3.0240E−008,
A10 = −3.0483E−010, A12 = 4.3914E−013
21th Surface K = 0.0000, A4 = −1.1919E−004, A6 = 7.1991E−007,
A8 = 1.1393E−009, A10 = −3.0161E−011
22th Surface K = 0.0000, A4 = −1.4658E−004, A6 = 6.8761E−007,
A8 = 4.7438E−009, A10 = −3.9115E−011

-continued

Numerical Example 6
Unit mm

| | Infinity | I0 = 20 cm |
|---|---|---|
| L1 | 3.48469 | 1.52603 |
| L2 | 15.4061 | 17.3647 |

Various Data

| f (mm) | 12.284 |
|---|---|
| Fno | 2.044 |
| 2ω (Angle of View (°)) | 85.6 |
| FB (mm) | 15.406 |
| Whole Length (mm) | 60.906 |

Numerical Example 7
Unit mm

Surface Data

| Surface No. | r | d | nd | νd |
|---|---|---|---|---|
| 1 | 15.956 | 1.300 | 1.51633 | 64.14 |
| 2 | 7.664 | 3.603 | | |
| 3 | 50.960 | 1.300 | 1.49700 | 81.54 |
| 4 | 7.828 | 3.030 | | |
| 5 | 12.452 | 3.175 | 1.88300 | 40.76 |
| 6 | 90.801 | 2.295 | | |
| 7 (Stop) | ∞ | 1.570 | | |
| 8 | −373.810 | 4.773 | 1.48749 | 70.23 |
| 9 | −6.816 | 1.114 | 1.73800 | 32.26 |
| 10 | 193.626 | 0.200 | | |
| 11 | 60.218 | 5.466 | 1.74320 | 49.34 |
| 12 | −10.754 | L1 | | |
| 13 | 38.455 | 2.616 | 1.80400 | 46.57 |
| 14 | −80.000 | 1.000 | 1.80518 | 25.42 |
| 15 | 85.524 | L2 | | |
| Image Plane | ∞ | | | |

Aspheric Data

1 Surface

K = −1.4647, A4 = −4.3796E−006, A6 = 2.7203E−008

2 Surface

K = −0.7863, A4 = 5.8198E−006, A6 = 3.0841E−007,
A8 = −2.2290E−008, A10 = 7.8438E−011

11 Surface

K = 0.0000, A4 = −1.3785E−005, A6 = 8.7436E−007, A8 = 4.9032E−009

12 Surface

K = −0.4995, A4 = 4.1774E−005, A6 = 2.0904E−007,
A8 = 1.4092E−008, A10 = −1.2430E−010,
A12 = 2.8585E−012

| | Infinity | I0 = 20 cm |
|---|---|---|
| L1 | 3.56072 | 1.32290 |
| L2 | 14.94852 | 17.18634 |

Various Data

| f (mm) | 12.103 |
|---|---|
| Fno | 2.873 |
| 2ω (Angle of View (°)) | 90.8 |
| FB (mm) | 14.949 |
| Whole Length (mm) | 49.9513 |

FIGS. 8 to 14 are aberration diagrams for the optical systems of Examples 1 to 7 upon focusing at infinity. Spherical aberrations and chromatic aberrations of magnification are given in terms of values at wavelengths of 404.7 nm (H-line: a dotted line), 435.8 nm (g-line: a long broken line), 486.1 nm (F-line: a one dotted chain line), 546.1 nm (E-line: a two-dotted chain line), 587.6 nm (d-line: a solid line), and 656.3 nm (C-line: a short broken line). For astigmatism, a solid line and a dotted line indicate the saggital image surface and the meridional image surface. Note here that FNO and FIY are indicative of the F-number and the image height, respectively.

Tabulated below are the values of the parameters in the respective conditions and the values of Conditions (1) to (15) in Examples 1 to 7.

| Parameters | Example 1 | Example 2 | Example 3 | Example 4 |
|---|---|---|---|---|
| f | 12.18695 | 12.28417 | 12.28666 | 10.71076 |
| ω | 45.61888 | 45.22059 | 45.21036 | 49.12892 |
| IHω | 11.15 | 11.15 | 11.15 | 11.15 |
| fn | −32.0632 | −20.3686 | −22.8972 | −28.8192 |
| f11 | −15.5124 | −11.5859 | −11.9833 | −11.3803 |
| Σd | 45.62606 | 32.4999 | 32.00001 | 35.5 |
| fb | 15.0408 | 15.0919 | 15.9041 | 14.5357 |
| flr | 22.39418 | 17.6344 | 18.47189 | 16.46134 |
| fl_fo | 48.1508 | 40.0001 | 40.0001 | 40 |
| Tair max | 5.8639 | 4.2568 | 3.4696 | 4.5365 |
| IHω 30 | 5.6552 | 5.6963 | 5.701 | 5.0287 |

| Parameters | Example 5 | Example 6 | Example 7 |
|---|---|---|---|
| f | 12.29041 | 12.28386 | 12.1027 |
| ω | 44.95614 | 42.78302 | 45.40534 |
| IHω | 11.15 | 11.15 | 11.15 |
| fn | −40.1773 | −39.4812 | −30.1774 |
| f11 | −15.0401 | −21.2922 | −10.7484 |
| Σd | 33.61498 | 45.5 | 35.00282 |
| fb | 14.7672 | 15.406 | 14.9485 |
| flr | 15.36666 | 18.97584 | 16.40369 |
| fl_fo | 32.7422 | 63.7332 | 84.2267 |
| Tair max | 7.473 | 7.1045 | 3.8653 |
| IHω 30 | 5.7921 | 5.7826 | 5.663 |

| Condition | Example 1 | Example 2 | Example 3 | Example 4 |
|---|---|---|---|---|
| (1) | 1.350 | 1.350 | 1.430 | 1.300 |
| (2) | −2.630 | −1.660 | −1.860 | −2.690 |
| (3) | −1.430 | −1.160 | −1.240 | −1.750 |
| (4) | 4.090 | 2.910 | 2.870 | 3.180 |
| (5) | −1.250 | −0.940 | −0.970 | −0.920 |
| (6) | −0.690 | −0.660 | −0.650 | −0.690 |
| (7) | −10.464 | −9.929 | −9.915 | −9.917 |
| (8) | 2.150 | 2.268 | 2.165 | 2.430 |
| (9) | 2.437 | 1.705 | 2.691 | 2.318 |
| (10) | 3.447 | 3.158 | 2.823 | 1.616 |
| (11) | −1.161 | −1.102 | −1.008 | −0.740 |
| (12) | −0.950 | −0.654 | −0.693 | −0.710 |
| (13) | 0.130 | 0.110 | 0.130 | 0.130 |
| (14) | 8.070 | 5.710 | 5.610 | 7.060 |
| (15) | 2.660 | 2.650 | 2.790 | 2.890 |

| Condition | Example 5 | Example 6 | Example 7 |
|---|---|---|---|
| (1) | 1.320 | 1.380 | 1.340 |
| (2) | −3.270 | −3.210 | −2.490 |
| (3) | −2.610 | −2.080 | −1.840 |
| (4) | 3.010 | 4.080 | 3.140 |
| (5) | −1.230 | −1.870 | −0.880 |
| (6) | −0.980 | −1.120 | −0.660 |
| (7) | −9.140 | −1.920 | −9.166 |
| (8) | 2.131 | 3.359 | 5.135 |
| (9) | 2.712 | 3.512 | 2.849 |
| (10) | 3.923 | 2.594 | 1.363 |
| (11) | −1.056 | −1.026 | −0.876 |
| (12) | −0.405 | −1.898 | −2.634 |
| (13) | 0.220 | 0.160 | 0.110 |
| (14) | 5.800 | 7.870 | 6.180 |
| (15) | 2.550 | 2.660 | 2.640 |

Figure 15:
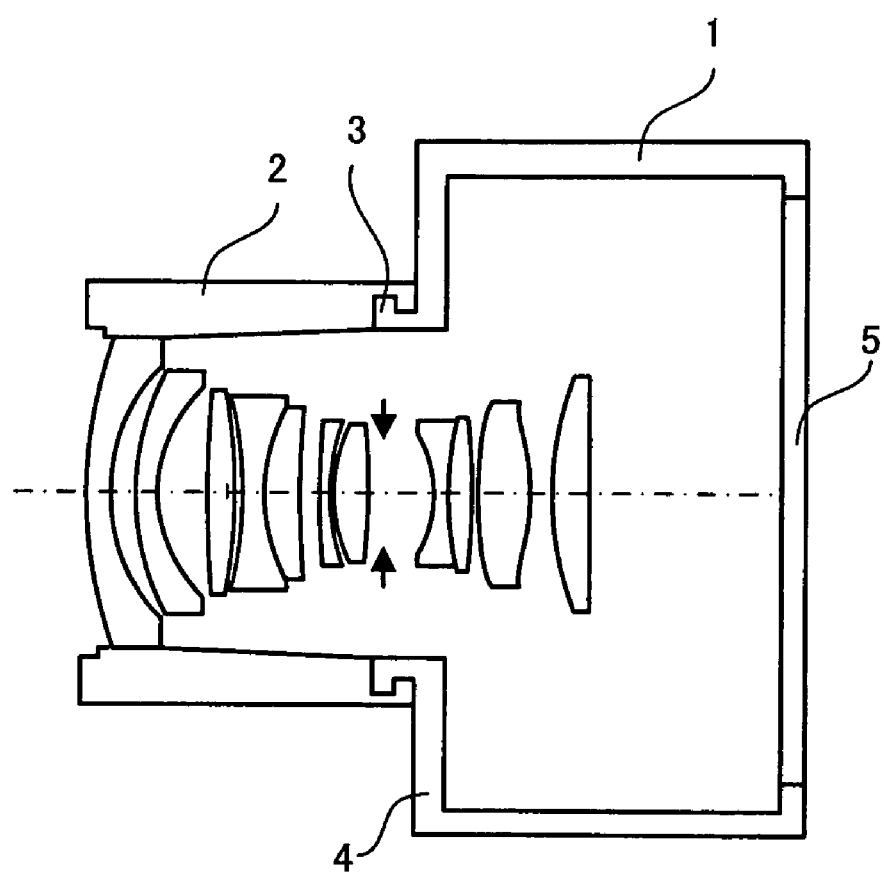
FIG. 15 is illustrative in section of a lens interchangeable camera with the inventive wide-angle lens used as an interchangeable lens.

FIG. 15 is illustrative in section of an electronic imaging apparatus taking the form of a single-lens mirrorless camera using the inventive lens, and employing a CCD, CMOS or other device as an imaging device. In FIG. 15, reference numeral 1 stands for a single-lens mirrorless camera, 2 a taking lens system received in a lens barrel, and 3 a mount portion of the lens barrel for making the taking lens system 2 attachable to or detachable from the single-lens mirrorless camera 1, for which a screw type mount, a bayonet type mount, etc. may be used. In this example, the bayonet type mount is used. Reference numerals 4 and 5 indicate an imaging device surface and a back monitor, respectively.

The inventive lens exemplified in each of Examples 1 to 7 may be used as the taking lens system 2 in the single-lens mirrorless camera 1 of such construction.

The present invention can provide an interchangeable lens fit for a single-lens mirror-less type digital camera: a compact, wide-angle optical system that has a reduced lenses count, is well corrected for various aberrations, especially chromatic aberrations and field curvature while corrected for distortion to a certain extent, and has telecentric capabilities.

Figure 16:
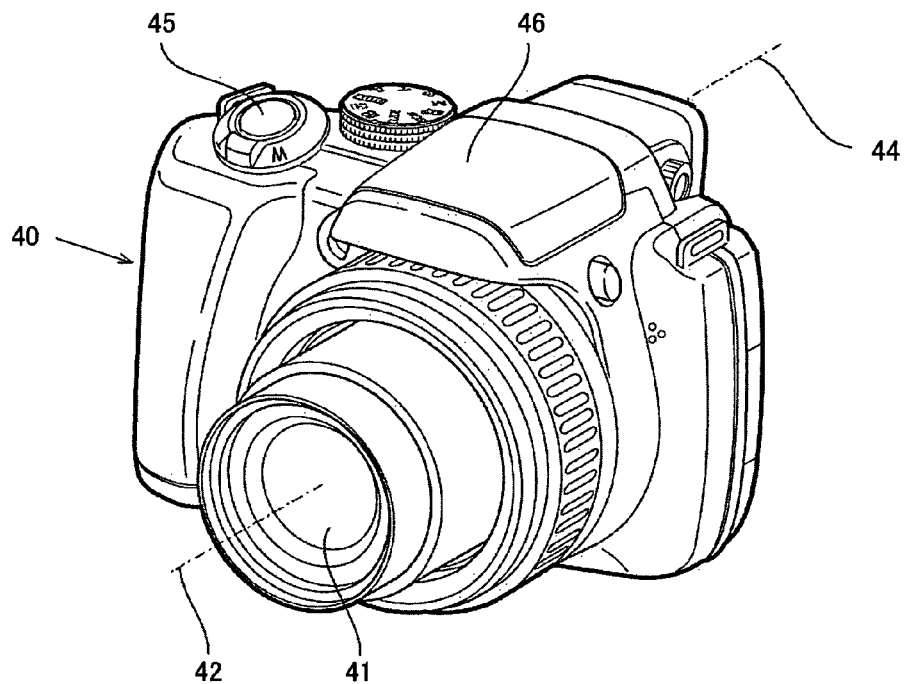
FIG. 16 is illustrative in perspective of the front outside shape of a digital camera according to the invention.
Figure 17:
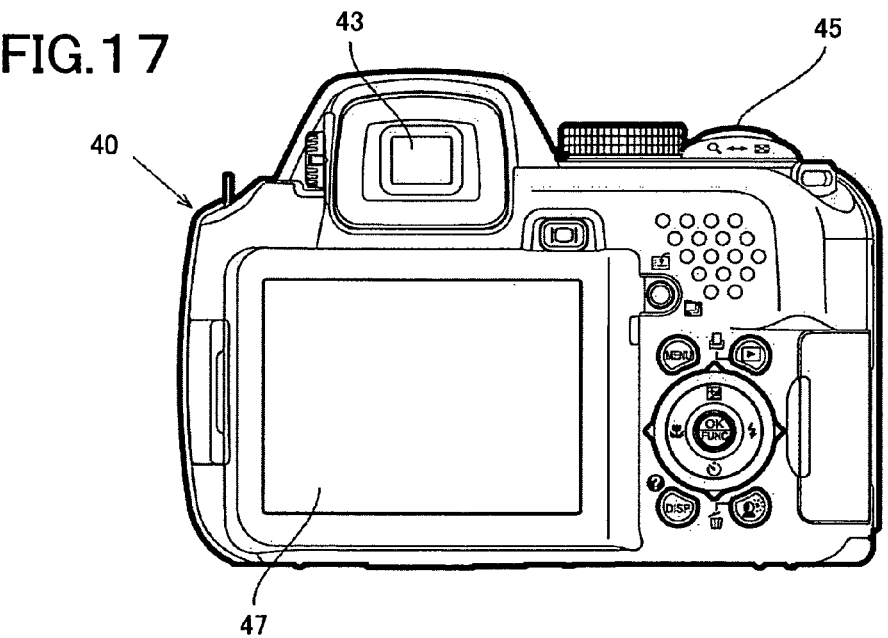
FIG. 17 is a rear side view of the digital camera of FIG. 16.
Figure 18:
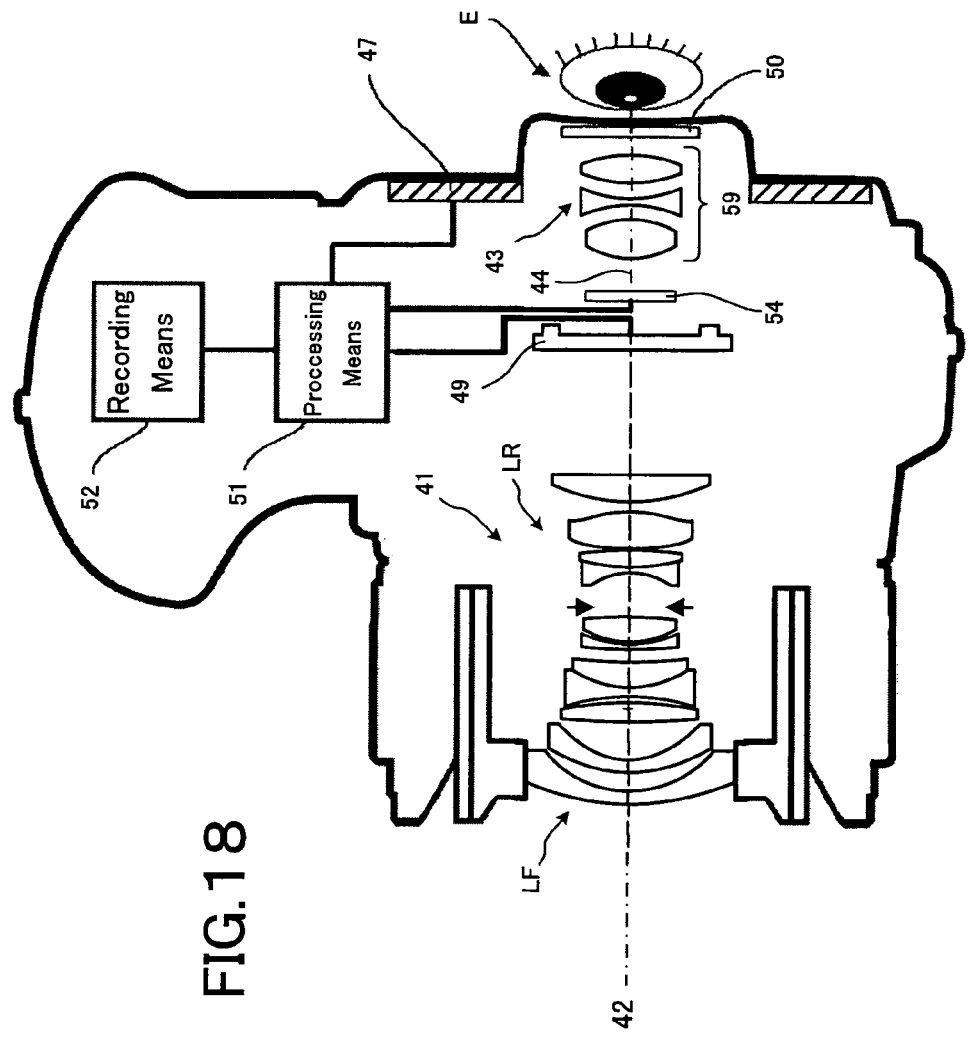
FIG. 18 is a cross-sectional view of the digital camera of FIG. 16.

FIGS. 16 to 18 are illustrative in conception of another inventive imaging apparatus with the lens built in a taking optical system 41. FIG. 16 is a front perspective view of the outside shape of a digital camera 40; FIG. 17 is a rear view of the same; and FIG. 18 is a schematic cross-sectional view of the construction of the digital camera 40.

The digital camera 40 here includes the taking optical system 41 positioned on a taking optical path 42, a finder optical system 43 positioned on a finder optical path 44, a shutter button 45, a popup flash 45, a liquid crystal display monitor 47 and the like. As the shutter button 45 located on the upper portion of the camera 40 is pressed down, it lets the taking optical system 41, for instance, the lens of Example 1 operate to take object images. An object image formed through the taking optical system 41 is formed on the imaging plane (photoelectric plane) of CCD 49 working as the imaging device located near the imaging plane. The object image received at CCD 49 is displayed as an electronic image on the liquid crystal display monitor 47 or a finder image display device 54 located on the back of the camera by way of processing means 51. The processing means 51 may also be connected with recording means 52 to record taken electronic images.

It is here noted that the recording means 52 may be provided separately from the processing means 51, and image information may be electronically recorded and written on it by means of flexible disks, memory cards, MOs or the like. If a silver halide film is used instead of CCD 49, a film-based camera is then set up.

In addition, a finder eyepiece lens 59 is located on the finder optical path 44. The object image displayed on the finder image display device 54 is enlarged and adjusted to an easy-to-watch dipoter and guided to a viewer s eyeball E. It is here noted that a cover member 50 is provided on the exit side of the finder eyepiece lens 59.

Figure 19:
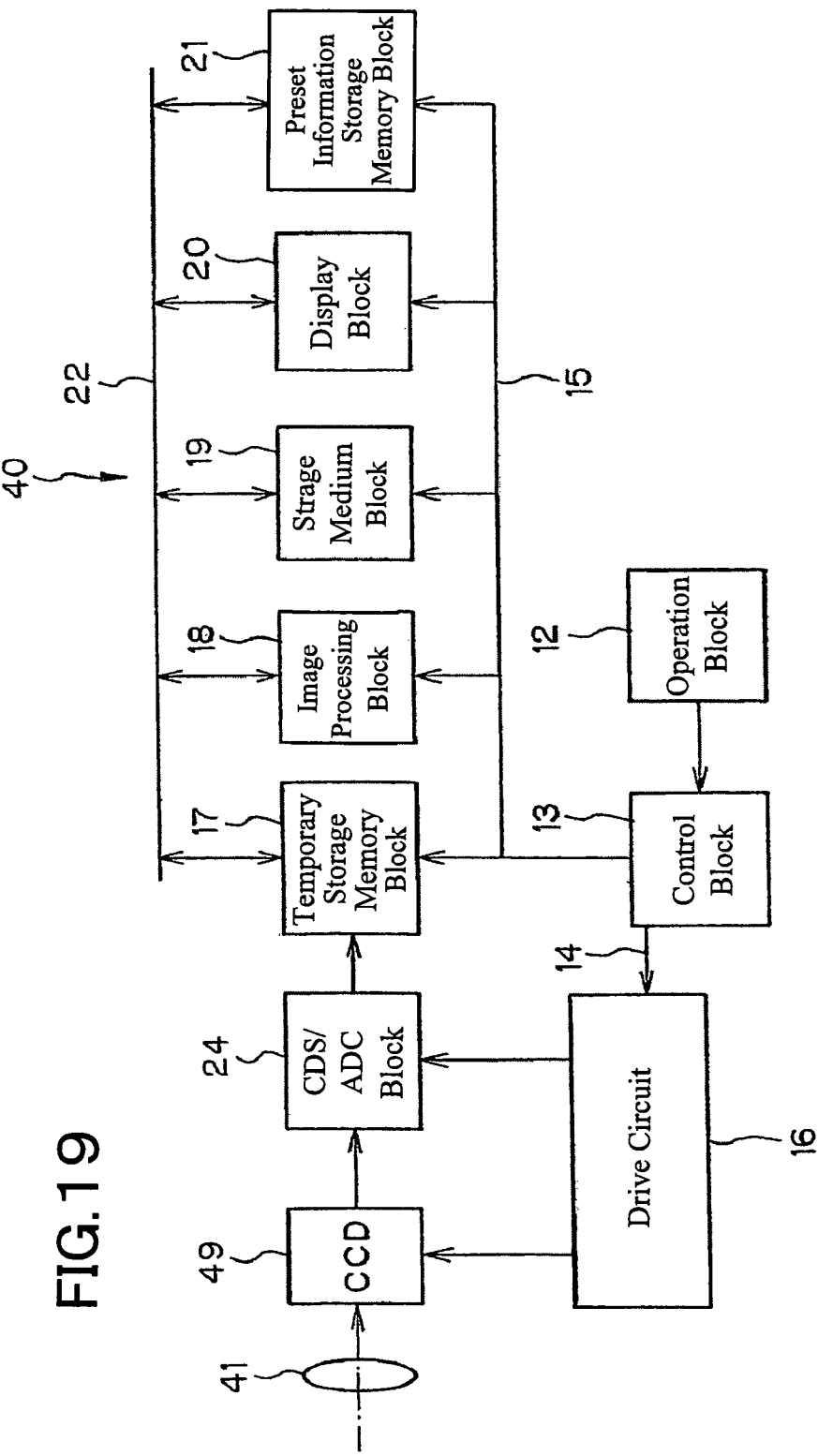
FIG. 19 is a block diagram for the internal circuit in the main part of the digital camera of FIG. 16.

FIG. 19 is a block diagram for the internal circuit in a main part of the digital camera 40. In the following explanation, for instance, the processing means 51 comprises a CDS/ADC block 24, a temporary storage memory block 17, an image processor block 18, etc., and the storage means 52 comprises a storage medium block 19 for instance, or the like.

As depicted in FIG. 19, the digital camera 40 is provided with an operation block 12, a control block 13 connected to the operation block 12, a drive circuit block 16 connected to a control signal output port of the control block 13 via buses 14 and 15, a temporal storage memory block 17, an image processor block 18, a storage medium block 19, a display block 20, and a preset information storage memory block 21.

The temporal storage memory block 17, image processor block 18, storage medium block 19, display block 20 and preset storage memory block 21 are set up in such a way as to mutually enter data in them and output data from them, and the drive circuit block 16 is connected with CCD 49 and CDS/ADC block 24.

The operation block 12 is a circuit that has various input buttons and switches, and sends event information entered from outside (camera operator) via such input buttons and switches to the control block. The control block 13 is a central processing unit comprising a CPU for instance, and a circuit having a built-in program memory (not shown) so that the whole digital camera 40 is controlled according to the program loaded in that program memory and in response to commands entered by the camera operator via the operation block 12.

CCD 49 receives the object image formed through the inventive taking optical system 41. CCD 49 is an imaging device that is driven and controlled by the drive circuit block 16 and converts the quantity of light for each pixel of that object image into electrical signals that are in turn outputted at the CDS/ADC block 24.

The CDS/ADC block 24 is a circuit that implements the amplification and analog/digital conversion of electrical signals entered from CCD 49 and sends image raw data only subjected to amplification and digital conversion (Bayer data hereinafter called RAW data) out to the temporal memory block 17.

The temporal storage memory block 17 is a buffer comprising an SDRAM for instance or the like, and a memory unit to temporarily store the RAW data produced out of the CDS/ADC block 24. The image processor block 18 is a circuit to read out the RAW data stored in the temporal storage memory block 17 or the RAW data stored in the storage medium block 19 so that an assortment of image processing inclusive of correction of distortion is electrically implemented according to the image parameter instructed from the control block 13.

The storage medium block 19 is a control circuit for a unit detachably attached to a card or stick type recording medium comprising a flash memory for instance or the like, in which the RAW data forwarded from the temporal storage memory block 17 or the image data processed at the image processor block 18 are recorded and retained.

The display block 20 is a circuit that is provided with the liquid crystal display monitor 47 and the finder image display device 54 to display images, operating menus, etc. on them. The preset information storage memory block 21 is provided with a ROM block having various image quality parameters already loaded in it and a RAM block to store an image quality parameter selected by entering operation at the operation block 12 from among the image quality parameters read out of that ROM block. The preset information storage memory block 21 is a circuit for controlling inputs to and output from those memories.

With the invention, the thus setup digital camera 40 provides an imaging apparatus incorporating a compact, less lenses count, wide-angle optical system that is well corrected for various aberrations, especially chromatic aberrations and field curvature while corrected for distortion to a certain extent, and has telecentric capabilities.

The present invention may be applied to not only the aforesaid so-called compact digital camera for taking general subjects but also a surveillance camera required to have a wide angle of view, etc.

What is claimed is:

1. An imaging optical system provided, comprising, in order from an object side to an image side thereof,
   a front lens group having a plurality of lenses including at least one negative lens,
   an aperture stop, and
   a rear lens group having positive refracting power, wherein:
   said rear lens group comprises, in order from the object side, a lens subgroup having positive refracting power and a focus lens group that has positive refracting power and moves upon focusing, and
   a lens located on the closest to object side in said front lens group always remains fixed in position, with satisfaction of the following conditions (1) and (2):

$$1.15 \leq fb/IH\omega \leq 1.7 \quad (1)$$

$$-4.0 \leq fn/f \leq -1.3 \quad (2)$$

where f is a focal length of the whole imaging optical system,
   fn is a focal length of a first negative lens on the closest to object side of negative lenses in said front lens group provided that lenses located on the closest to object side are not necessarily of negative power,
   fb is a back focus of the imaging optical system upon focusing on an object point at infinity provided that the back focus is a length, as calculated on an air basis, from an image-side refractive surface of a lens located on the closest to image side in said rear lens group to an imaging plane, and
   IHω is a distance from an optical axis of a position where a chief ray from a maximum incident half angle of view upon focusing on an object point at infinity is imaged at the imaging plane.

2. The imaging optical system according to claim 1, wherein said focus lens group comprises two lenses at most.

3. The imaging optical system according to claim 1, wherein said first negative lens is a meniscus lens concave on said aperture stop side.

4. The imaging optical system according to claim 1, wherein said first negative lens is located on the closest to object side in the imaging optical system.

5. The imaging optical system according to claim 1, wherein said first negative lens is a meniscus lens that is located on the closest to object side in the imaging optical system and concave on said aperture stop side.

6. The imaging optical system according to claim 1, which satisfies the following condition (3):

$$-3.5 \leq fn/flr \leq -0.8 \quad (3)$$

where flr is a focal length of said rear lens group of positive refractive power.

7. The imaging optical system according to claim 1, which satisfies the following condition (4):

$$1.5 \leq \Sigma d/IH\omega \leq 0.6 \quad (4)$$

where Σd is a length on an optical axis of said imaging optical system from an entrance surface to an exit surface thereof.

8. The imaging optical system according to claim 1, which satisfies the following condition (5):

$$-2.7 \leq fl1/(f \cdot \tan \omega) - 0.6 \quad (5)$$

where fl1 is a entire focal length of two lenses: one located on the closest to object side in the imaging optical system and one located just after an image side thereof, and
   ω is a maximum incident half angle of view upon focusing on an object point at infinity.

9. The imaging optical system according to claim 8, wherein at least one of the two lenses located on the closest to object side in the imaging optical system and just after the image side thereof has an aspheric surface in which an absolute value of refracting power of a local surface becomes small with a distance from the optical axis.

10. The imaging optical system according to claim 1, which satisfies the following condition (6):

$$-2 \leq fl1/flr \leq -0.3 \quad (6)$$

where fl1 is a entire focal length of two lenses: one located on the closest to object side in the imaging optical system and one located just after on an image side therein, and
   flr is a focal length of said rear lens group of positive refracting power.

11. The imaging optical system according to claim 1, wherein a lens group that moves in the optical axis direction is only said focus lens group.

12. The imaging optical system according to claim 1, wherein said focus lens group is located on the closest to image side in the imaging optical system.

13. The imaging optical system according to claim 12, wherein a surface on the closest to object side in said focus lens group is convex on the object side.

14. The imaging optical system according to claim 1, wherein said focus lens group consists only of one positive lens.

15. The imaging optical system according to claim 1, which satisfies the following condition (7):

$$-25\% < DT < -7\% \quad (7)$$

where DT is a quantity of distortion:

$$DT = [(IH\omega - f \cdot \tan \Omega)/(f \cdot \tan \omega)] \times 100(\%)$$

where ω is the maximum half angle of view upon focusing on an object point at infinity.

16. The imaging optical system according to claim 1, which satisfies the following condition (8):

$$1.5 \leq fl\_fo/flr \leq 8.0 \quad (8)$$

where fl_fo is a focal length of said focus lens group of positive refracting power, and
   flr is a focal length of said rear lens group of positive refracting power.

17. The imaging optical system according to claim 1, which satisfies the following condition (9):

$$1.4 \leq SF11 \leq 4.0 \quad (9)$$

where SF11 is a shape factor of said first negative lens in said front lens group):

$$SF11 = (R11 + R12)/(R11 - R12)$$

where R11 is a paraxial radius of curvature of an object-side surface of said first negative lens, and
   R12 is a paraxial radius of curvature of an image-side surface of said first negative lens.

18. The imaging optical system according to claim 1, wherein a second negative lens is positioned just after an image side of the first negative lens in said front lens group, with satisfaction of the following condition (10):

$$1.0 \leq SF21 \leq 7.0 \quad (10)$$

where SF21 is a shape factor of said second negative lens):

$$SF21 = (R21 + R22)/(R21 - R22)$$

where R21 is a paraxial radius of curvature of an object-side surface of said second negative lens, and
R22 is a paraxial radius of curvature of an image-side surface of said second negative lens.

19. The imaging optical system according to claim 1 or, which satisfies the following condition (11):

$$-1.4 \leq R\_RL1R/(f\tan\omega) \leq 0.5 \quad (11)$$

where R_LR1R is a paraxial radius of curvature of a lens surface on the closest to image side in said lens subgroup in said rear lens group,
f is a focal length of the whole imaging optical system, and
ω is a maximum incident half angle of view upon focusing on an object point at infinity.

20. The imaging optical system according to claim 1, wherein the total number of lenses in said focus lens group is 2 at most, with satisfaction of the following condition (12):

$$-4.5 \leq SF\_LRF \leq 0 \quad (12)$$

where SF_LRF is represented by $$SF\_LRF = R\_LRFF + R\_LRFR)/(R\_LRFF - R\_LRFR)$$

where R_LRFF is a paraxial radius of curvature of a lens surface located on the closest to object side in said focus lens group, and
R_LRFR is a paraxial radius of curvature of a lens surface located on the closest to image side in said focus lens group.

21. The imaging optical system according to claim 1, which satisfies the following condition (13):

$$Tair\_max/\Sigma d \leq 0.27 \quad (13)$$

where Tair_max is a longest axial air spacing length between the entrance surface and the exit surface in the imaging optical system, and
Σd is the length on the optical axis of the imaging optical system from the entrance surface to the exit surface thereof.

22. The imaging optical system according to claim 1, which satisfies the following condition (14):

$$3.0 \leq \Sigma d/IH\omega 30 \leq 10.0 \quad (14)$$

where Σd is a length on the optical axis of the imaging optical system from the entrance surface to the exit surface thereof, and
IHω30 is a height of the imaging optical system, as measured from the optical axis, at a point of intersection with the imaging plane of a chief ray incident at an angle of view of 30 degrees on the imaging optical system upon focusing on an object point at infinity.

23. The imaging optical system according to claim 1, which satisfies the following condition (15):

$$2.0 \leq fb/IH\omega 30 \leq 4.0 \quad (15)$$

where fb is a back focus of the imaging optical system upon focusing on an object point at infinity, said back focus being a length, as calculated on an air basis, from an image-side refracting surface of the lens located on the closest to image side in the rear lens group to the imaging plane, and
IHω30 is a height of the imaging optical system, as measured from the optical axis, at a point of intersection with the imaging plane of a chief ray incident at an angle of view of 30 degrees on the imaging optical system upon focusing on an object point at infinity.

24. An imaging apparatus, comprising:
an imaging optical system as recited in claim 1, and an imaging device that is located on an image side of said imaging optical system and has an imaging plane for converting an optical image into electrical signals.

25. An imaging optical system, comprising, in order from an object side to an image side thereof,
a front lens group comprising a plurality of lenses including a first negative lens concave on the image side,
an aperture stop, and
a rear lens group having positive refracting power, wherein:
said rear lens group comprises, in order from the object side, a lens subgroup having positive refracting power and a focus lens group that has positive refracting power and moves upon focusing;
a lens group that moves in an optical axis direction is only said focus lens group; and
said first negative lens is a lens of negative lenses in said front lens group, which lens is located on the closest to object side, with satisfaction of the following conditions (4) and (7):

$$1.5 \leq \Sigma d/IH\omega \leq 6.0 \quad (4)$$

$$-25\% < DT < -7\% \quad (7)$$

where ωd is a length on an optical axis of the imaging optical system from an entrance surface to an exit surface thereof,
IHω is a distance from an optical axis of a position where a chief ray from a maximum incident half angle of view (ω) upon focusing on an object point at infinity is imaged at the imaging plane, and
DT is a quantity of distortion:

$$DT = [(IH\omega - f\tan\omega)/(f\tan\omega)] \times 100\ (\%)$$

where ω is a maximum incident half angle of view upon focusing on an object point at infinity.

26. The imaging optical system according to claim 25, wherein said first negative lens concave on the image side is a meniscus lens.

27. An imaging optical system, comprising, in order from an object side to an image side thereof,
a front lens group comprising a plurality of lenses including a first negative lens concave on the image side,
an aperture stop, and
a rear lens group having positive refracting power, wherein:
said rear lens group comprises, in order from the object side, a lens subgroup having positive refracting power and a focus lens group that has positive refracting power and moves upon focusing;
a lens group that moves in an optical axis direction is only said focus lens group (LRF); and
said first negative lens is a lens of negative lenses in said front lens group, which lens is located on the closest to object side, with satisfaction of the following conditions (3) and (6):

$$-3.5 \leq fn/flr \leq -0.8 \quad (3)$$

$$-2 \leq fl1/flr \leq -0.3 \quad (6)$$

where fn is a focal length of a negative lens of negative lenses in said front lens group, which negative lens is located on the closest to object side,
flr is a focal length of said rear lens group of positive refractive power, and
fl1 is a combined focal length of two lenses: one located on the closest to object side in the imaging optical system and one located just after the image side therein.

* * * * *